(12) United States Patent
Lee et al.

(10) Patent No.: US 10,281,327 B2
(45) Date of Patent: May 7, 2019

(54) SPECTROMETERS WITH SELF-COMPENSATION OF ROTATIONAL MISALIGNMENT

(71) Applicant: Stratio, Seoul (KR)

(72) Inventors: Jae Hyung Lee, Palo Alto, CA (US);
Youngsik Kim, Santa Clara, CA (US);
Yeul Na, East Palo Alto, CA (US);
Juhyung Kang, Bayside, NY (US)

(73) Assignee: STRATIO, Seoul (KR)

( * ) Notice: Subject to any disclaimer, the term of this patent is extended or adjusted under 35 U.S.C. 154(b) by 0 days.

(21) Appl. No.: 15/821,591

(22) Filed: Nov. 22, 2017

(65) Prior Publication Data

US 2018/0094976 A1 Apr. 5, 2018

Related U.S. Application Data

(63) Continuation-in-part of application No. PCT/US2016/064585, filed on Dec. 2, 2016.
(Continued)

(51) Int. Cl.
*G01J 3/14* (2006.01)
*G01J 3/02* (2006.01)
(Continued)

(52) U.S. Cl.
CPC .............. *G01J 3/14* (2013.01); *G01J 3/0289* (2013.01); *G01J 3/2803* (2013.01); *G02B 5/04* (2013.01);
(Continued)

(58) Field of Classification Search
CPC ................ G01J 3/14; G01J 2003/1208; G01J 2003/145; G01J 3/502
See application file for complete search history.

(56) References Cited

U.S. PATENT DOCUMENTS 3,900,263 A * 8/1975 Hall, Jr. ................ G01J 3/14
                                                                356/300
4,183,668 A * 1/1980 Lindblom ............ G01J 3/1804
                                                                356/305
(Continued)

FOREIGN PATENT DOCUMENTS

CN    106940218 A    7/2017
GB        765775 A *  1/1957 ............. G02B 13/10

OTHER PUBLICATIONS

Stratio, Inc., International Search Report and Written Opinion, PCT/US2016/064585, dated Mar. 23, 2017, 8 pgs.
(Continued)

*Primary Examiner* — Tri Ton
*Assistant Examiner* — Rufus Phillips
(74) *Attorney, Agent, or Firm* — Morgan, Lewis & Bockius LLP

(57) ABSTRACT

An apparatus for analyzing light includes an input aperture for receiving light; a first set of one or more lenses configured to relay light from the input aperture; and a prism assembly configured to disperse light from the first set of one or more lenses. The prism assembly includes a plurality of prisms that includes a first prism, a second prism that is distinct from the first prism, and a third prism that is distinct from the first prism and the second prism. The first prism is mechanically coupled with the second prism and the second prism is mechanically coupled with the third prism. The apparatus also includes a second set of one or more lenses configured to focus the dispersed light from the prism assembly; and an array detector configured for converting the light from the second set of one or more lenses to electrical signals.

20 Claims, 28 Drawing Sheets

Related U.S. Application Data

(60) Provisional application No. 62/294,183, filed on Feb. 11, 2016, provisional application No. 62/578,354, filed on Oct. 27, 2017.

(51) Int. Cl.
  *G02B 27/10* (2006.01)
  *G02B 5/04* (2006.01)
  *G01J 3/28* (2006.01)

(52) U.S. Cl.
  CPC ......... *G02B 5/045* (2013.01); *G02B 27/1013* (2013.01)

(56) References Cited

U.S. PATENT DOCUMENTS

| | | | |
|---|---|---|---|
| 4,704,008 A * | 11/1987 | Mercado | G02B 13/00 359/669 |
| 5,781,290 A | 7/1998 | Bittner et al. | |
| 6,043,882 A * | 3/2000 | De Wolf | G01J 3/14 356/237.1 |
| 9,664,988 B2 | 5/2017 | Huang | |
| 2002/0001135 A1 * | 1/2002 | Berman | G02B 27/145 359/640 |
| 2004/0135084 A1 | 7/2004 | Sting et al. | |
| 2004/0136074 A1 | 7/2004 | Ford et al. | |
| 2006/0056014 A1 * | 3/2006 | Seward | G02B 13/10 359/368 |
| 2008/0106732 A1 | 5/2008 | Brady et al. | |
| 2011/0285995 A1 | 11/2011 | Tkaczyk et al. | |
| 2012/0219029 A1 | 8/2012 | Scott et al. | |
| 2014/0190189 A1 | 11/2014 | Wang et al. | |
| 2015/0168311 A1 | 6/2015 | Seki et al. | |
| 2015/0281530 A1 * | 10/2015 | Kessler | G03B 17/565 348/373 |
| 2016/0234411 A1 * | 8/2016 | Yin | G02B 13/0085 |

OTHER PUBLICATIONS

Stratio, Inc., International Search Report and Written Opinion, PCT/US2018/058059, dated Jan. 16, 2019, 9 pgs.

* cited by examiner

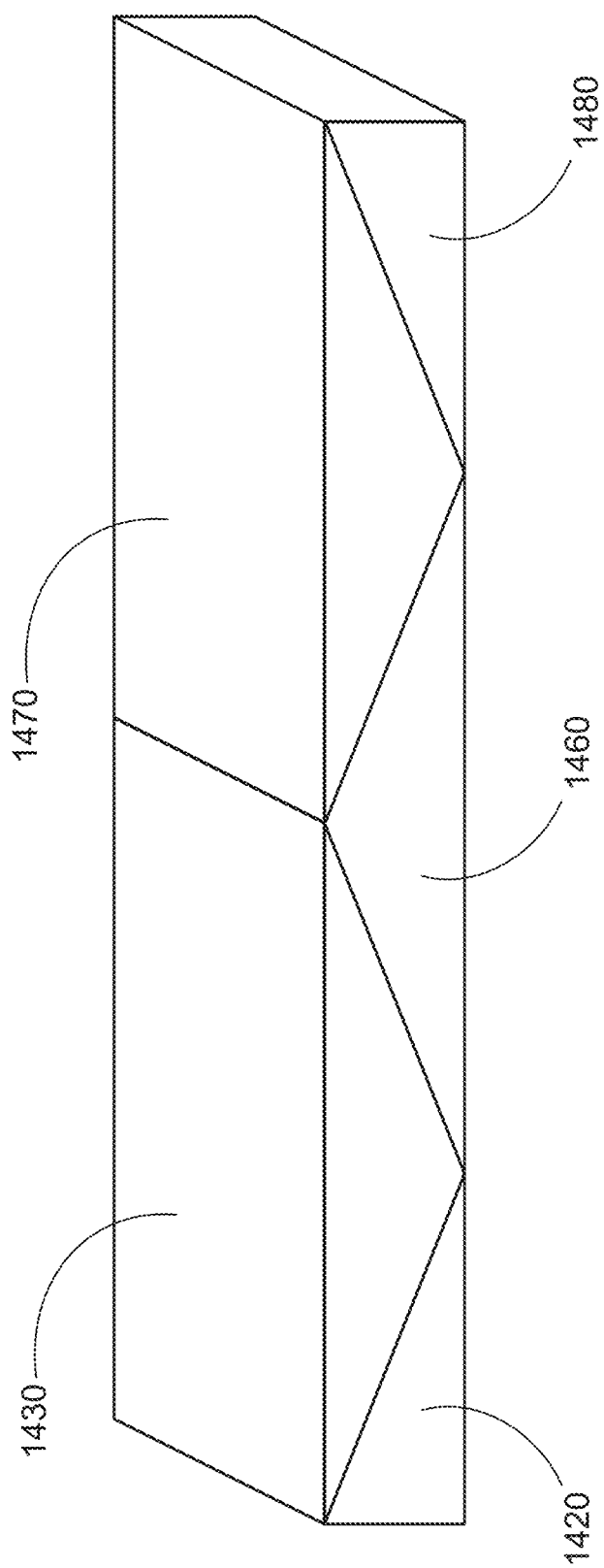

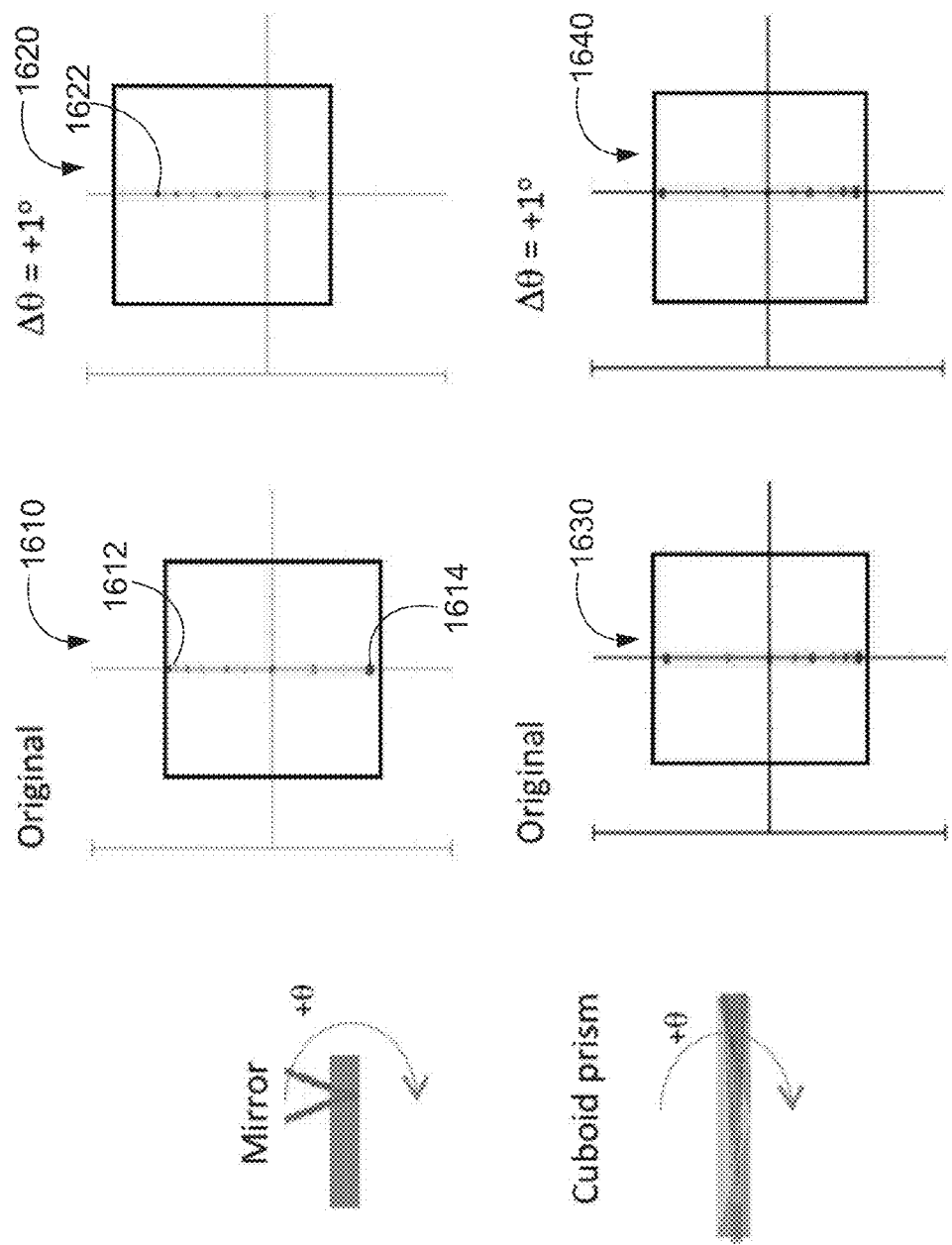

SPECTROMETERS WITH SELF-COMPENSATION OF ROTATIONAL MISALIGNMENT

RELATED APPLICATION

This application is a continuation-in-part application of International Patent Application No. PCT/US2016/064585, filed Dec. 2, 2016, entitled "Broadband Visible-Shortwave Infrared Spectrometer," which claims priority to, and benefit of, U.S. Provisional Patent Application Ser. No. 62/294,183, filed Feb. 11, 2016, entitled "Broadband Visible-Shortwave Infrared Spectrometer." This application also claims priority to, and benefit of, U.S. Provisional Patent Application Ser. No. 62/578,354, filed Oct. 27, 2017, entitled "Spectrometers with Self-Compensation of Rotational Misalignment." All of these applications are incorporated by reference herein in their entireties.

TECHNICAL FIELD

This application relates generally to apparatus for analyzing light, such as spectrometers. More particularly, the disclosed embodiments relate to apparatus for analyzing light that reduce rotational misalignment.

BACKGROUND

A spectrometer is an apparatus used for analyzing light. Spectrometers typically separate the light based on colors and record and/or measure the separated color components (often called "spectrum"). Spectrometers are used for detection, recognition, identification, and further analysis of objects that emit, reflect, or absorb light.

However, traditional spectrometers often require calibration for accurate operations. For example, spectrometers produced by a same manufacturer can have device-to-device variations, so the manufacturer needs to calibrate each spectrometer before shipping the spectrometers. In addition, optical components within the spectrometers may move due to mechanical forces (e.g., shocks and vibrations) during use, transportation, and/or storage, and the spectrometers need to be frequently re-calibrated. This reduces the usability of the spectrometers and the accuracy and reproducibility of the spectrometers, which has limited application of traditional spectrometers.

SUMMARY

Thus, there is a need for an apparatus for analyzing light (e.g., a spectrometer) with reduced misalignments. Such apparatus is robust and requires less frequent calibrations.

A number of embodiments that overcome the limitations and disadvantages described above are presented in more detail below. These embodiments provide apparatuses and methods for analyzing light with reduced needs for calibration and recalibration.

In addition, shortwave infrared provides information not available in visible light. Collecting and analyzing both shortwave infrared light and visible light can enhance detection, recognition, identification, and further analysis of objects that emit, reflect, or absorb shortwave infrared and visible light.

However, traditional instruments are not efficiently designed for analyzing both visible light and infrared light. Such instruments typically have separate detectors and separate optical components for different wavelength ranges. For example, such instruments include visible light detectors and associated optical components for analyzing visible light and separately include infrared light detectors and associated optical components for analyzing infrared light. Such instruments are bulky, heavy, and expensive, which has limited applications of traditional instruments. Some of the embodiments described herein provide apparatuses and methods for using devices for analyzing visible and shortwave infrared light.

As described in more detail below, some embodiments involve an apparatus for analyzing light. The apparatus includes an input aperture for receiving light; a first set of one or more lenses configured to relay light from the input aperture; and a prism assembly configured to disperse light from the first set of one or more lenses. The prism assembly includes a plurality of prisms that includes a first prism, a second prism that is distinct from the first prism, and a third prism that is distinct from the first prism and the second prism. The first prism is mechanically coupled with the second prism and the second prism is mechanically coupled with the third prism. The apparatus also includes a second set of one or more lenses configured to focus the dispersed light from the prism assembly; and an array detector configured for converting the light from the second set of one or more lenses to electrical signals.

In accordance with some embodiments, a method for analyzing light includes receiving light with any apparatus described herein; and processing electrical signals from the array detector of the apparatus to obtain the intensity of the received light for respective wavelengths.

In accordance with some embodiments, an apparatus for concurrently analyzing visible and shortwave infrared light includes an input aperture for receiving light that includes a visible wavelength component and a shortwave infrared wavelength component; a first set of one or more lenses configured to relay light from the input aperture; one or more dispersive optical elements configured to disperse light, from the first set of one or more lenses, that includes the visible wavelength component and the shortwave infrared wavelength component; a second set of one or more lenses configured to focus the dispersed light, from the one or more dispersive optical elements, that includes the visible wavelength component and the shortwave infrared wavelength component; and an array detector configured for converting the light from the second set of one or more lenses to electrical signals that include electrical signals indicating intensity of the visible wavelength component and electrical signals indicating intensity of the shortwave infrared wavelength component.

In accordance with some embodiments, a method for concurrently analyzing visible and shortwave infrared light includes receiving light that includes a visible wavelength component and a shortwave infrared wavelength component with any apparatus described herein so that at least a portion of the visible wavelength component and at least a portion of the shortwave infrared wavelength component concurrently impinge on the array detector of the apparatus; and processing the electrical signals from the array detector to obtain the intensity of the visible wavelength component and the intensity of the shortwave infrared wavelength component.

In accordance with some embodiments, a device for sensing light includes a first semiconductor region doped with a dopant of a first type and a second semiconductor region doped with a dopant of a second type. The second semiconductor region is positioned above the first semiconductor region; and the first type is distinct from the second type. The device includes a gate insulation layer positioned above the second semiconductor region; a gate positioned above the gate insulation layer; a source electrically coupled with the second semiconductor region; and a drain electrically coupled with the second semiconductor region. The second semiconductor region has a top surface that is positioned toward the gate insulation layer, and the second semiconductor region has a bottom surface that is positioned opposite to the top surface of the second semiconductor region. The second semiconductor region has an upper portion that includes the top surface of the second semiconductor region. The second semiconductor region also has a lower portion that includes the bottom surface of the second semiconductor region and is mutually exclusive with the upper portion. The first semiconductor region is in contact with both the upper portion and the lower portion of the second semiconductor region. The first semiconductor region is in contact with the upper portion of the second semiconductor region at least at a location positioned under the gate.

In accordance with some embodiments, a method of forming a device for sensing light includes forming a first semiconductor region, above a silicon substrate, doped with a dopant of a first type and forming a second semiconductor region, above the silicon substrate, doped with a dopant of a second type. The second semiconductor region is positioned above the first semiconductor region. The first type is distinct from the second type. The method also includes forming a gate insulation layer above the second semiconductor region. One or more portions of the second semiconductor region are exposed from the gate insulation layer to define a source and a drain. The second semiconductor region has a top surface that faces the gate insulation layer. The second semiconductor region has a bottom surface that is opposite to the top surface of the second semiconductor region. The second semiconductor region has an upper portion that includes the top surface of the second semiconductor region. The second semiconductor region has a lower portion that includes the bottom surface of the second semiconductor region and is mutually exclusive with the upper portion. The first semiconductor region is in contact with both the upper portion and the lower portion of the second semiconductor region. The first semiconductor region is in contact with the upper portion of the second semiconductor region at least at a location positioned under the gate. The method further includes forming a gate positioned above the gate insulation layer.

In accordance with some embodiments, a method of forming a sensor array includes concurrently forming a plurality of devices on a common silicon substrate using any of the above-described methods.

In accordance with some embodiments, a sensor circuit includes a photo-sensing element, the photo-sensing element having a source terminal, a gate terminal, a drain terminal, and a body terminal. The sensor circuit also includes a selection transistor having a source terminal, a gate terminal, and a drain terminal. The drain terminal of the selection transistor is electrically coupled with the source terminal of the photo-sensing element or the source terminal of the selection transistor is electrically coupled with the drain terminal of the photo-sensing element.

In accordance with some embodiments, a converter circuit includes a first transimpedance amplifier having an input terminal electrically coupled with the source terminal or the drain terminal, of the selection transistor of a first sensor circuit that corresponds to any of the above-described sensor circuits, that is not electrically coupled with the source terminal or the drain terminal of the photo-sensing element. The first transimpedance amplifier is configured to convert a current input from the photo-sensing element into a voltage output. The converter circuit also includes a differential amplifier having two input terminals, a first input terminal of the two input terminals electrically coupled with the voltage output of the first transimpedance amplifier and a second input terminal of the two input terminals electrically coupled with a voltage source that is configured to provide a voltage corresponding to a base current provided by the photo-sensing element. The differential amplifier is configured to output a voltage based on a voltage difference between the voltage output and the voltage provided by the voltage source.

In accordance with some embodiments, an image sensor device includes an array of sensors. A respective sensor in the array of sensors includes any of the above-described sensor circuits.

In accordance with some embodiments, a method includes exposing the photo-sensing element of any of the above-described sensor circuits. The method also includes providing a fixed voltage to the source terminal of the photo-sensing element; and measuring a drain current of the photo-sensing element.

In accordance with some embodiments, a method includes exposing the array of sensors of any of the above-described image sensor devices to a pattern of light. The method also includes, for a photo-sensing element of a respective sensor in the array of sensors, providing a respective voltage to the source terminal of the photo-sensing element of the respective sensor; and measuring a drain current of the photo-sensing element.

Thus, described methods, devices, and apparatuses provide efficient, compact, and low-cost apparatuses in analyzing visible and shortwave infrared light. Such methods, devices, and apparatuses may complement or replace conventional methods, devices, and apparatuses for analyzing visible and shortwave infrared light.

BRIEF DESCRIPTION OF THE DRAWINGS

For a better understanding of the aforementioned aspects as well as additional aspects and embodiments thereof, reference should be made to the Description of Embodiments below, in conjunction with the following drawings.

FIGS. 15A-15C illustrate a prism assembly and its components in accordance with some embodiments.

FIG. 16 illustrates shifting of a spectrum caused by rotation of respective optical elements in accordance with some embodiments.

Like reference numerals refer to corresponding parts throughout the figures.

Figure 1A:
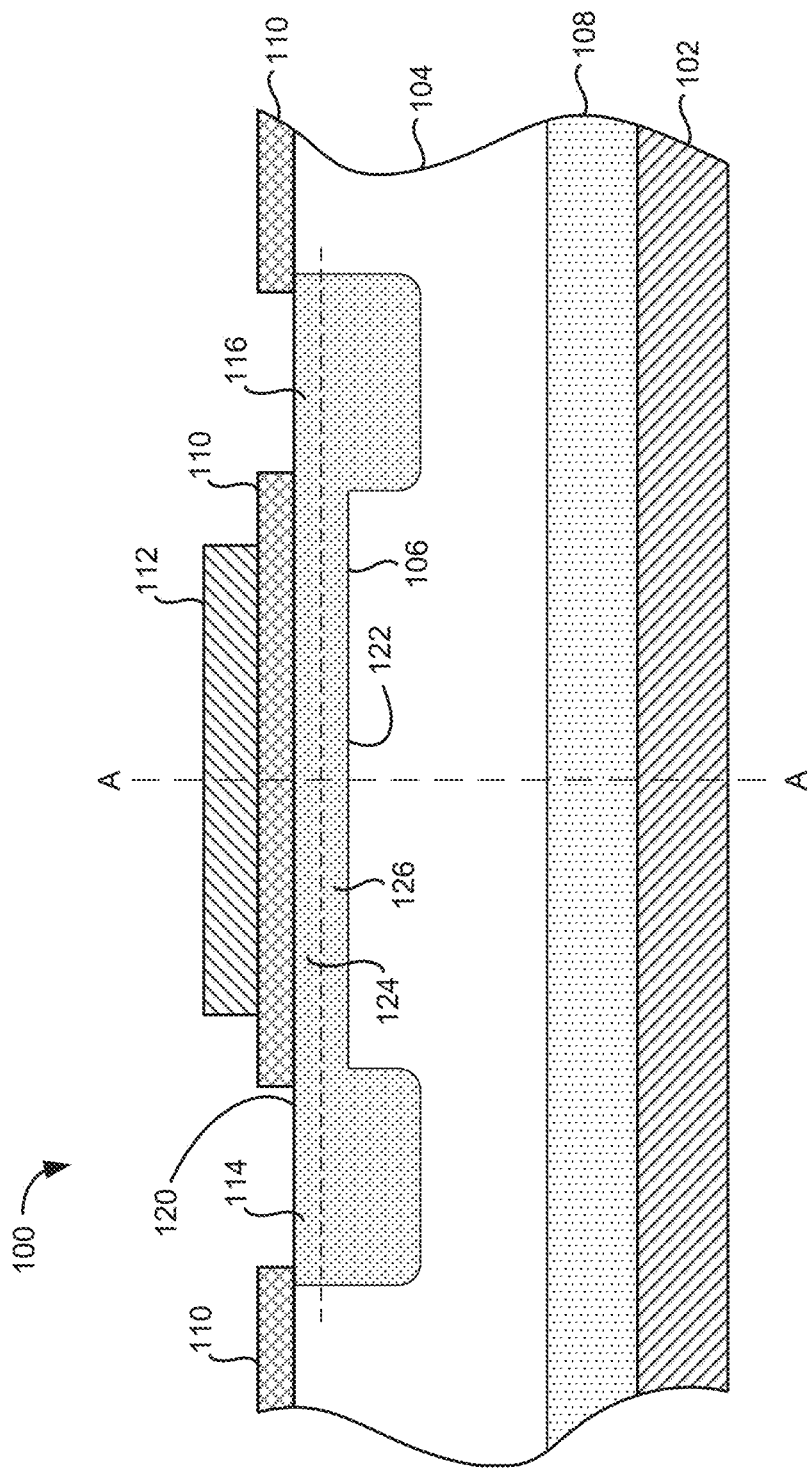
FIG. 1A is a partial cross-sectional view of a semiconductor optical sensor device in accordance with some embodiments.

Unless noted otherwise, the figures are not drawn to scale.

DESCRIPTION OF EMBODIMENTS

Traditional optical sensors, such as complementary metal-oxide-semiconductor (CMOS) sensors and charge modulation devices, suffer from dark current and a trade-off between a quantum efficiency and a weak channel modulation.

In addition, the problems are exacerbated when shortwave infrared light is to be detected. Traditional sensors made of silicon are not adequate for sensing and imaging shortwave infrared light (e.g., light within a wavelength range of 1400 nm to 3000 mm), because silicon is deemed to be transparent to light having a wavelength longer than 1100 nm (which corresponds with the bandgap of silicon).

Infrared sensors made of Indium Gallium Arsenide (InGaAs) and Germanium (Ge) suffer from high dark current. Many InGaAs and sensors are cooled to operate in a low temperature (e.g., −70° C.). However, cooling is disadvantageous for many reasons, such as cost of the cooling unit, an increased size of the device due to the cooling unit, an increased operation time for cooling the device, and increased power consumption for cooling the device.

Furthermore, traditional instruments for analyzing both visible light and infrared light typically have separate detectors and separate optical components for different wavelength ranges. For example, such instruments include visible light detectors and associated optical components for analyzing visible light and separately include infrared light detectors and associated optical components for analyzing infrared light. Such instruments are bulky, heavy, and expensive, which has limited applications of traditional instruments.

Devices, apparatuses, and methods that address the above problems are described herein. By providing apparatuses that include array detectors configured for converting both visible light and shortwave infrared light to electrical signals, compact, light, and reduced-cost devices and apparatuses can be provided for analyzing visible and shortwave infrared light.

In some embodiments, such devices and apparatuses are used for hyperspectral imaging, thereby allowing spatial analysis of collected light (e.g., analysis of spatial distribution of collected light).

Reference will be made to certain embodiments, examples of which are illustrated in the accompanying drawings. While the underlying principles will be described in conjunction with the embodiments, it will be understood that it is not intended to limit the scope of claims to these particular embodiments alone. On the contrary, the claims are intended to cover alternatives, modifications and equivalents that are within the scope of the claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the underlying principles.

It will also be understood that, although the terms first, second, etc. may be used herein to describe various elements, these elements should not be limited by these terms. These terms are only used to distinguish one element from another. For example, a first semiconductor region could be termed a second semiconductor region, and, similarly, a second semiconductor region could be termed a first semiconductor region, without departing from the scope of the claims. The first semiconductor and the second semiconductor region are both semiconductor regions, but they are not the same semiconductor regions.

The terminology used in the description of the embodiments herein is for the purpose of describing particular embodiments only and is not intended to limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1A is a partial cross-sectional view of a semiconductor optical sensor device 100 in accordance with some embodiments.

In some embodiments, the device 100 is called a gate-controlled charge modulated device (GCMD) (also called herein a gate-controlled charge modulation device).

The device 100 includes a first semiconductor region 104 doped with a dopant of a first type (e.g., an n-type semiconductor, such as phosphorus or arsenic) and a second semiconductor region 106 doped with a dopant of a second type (e.g., a high concentration of a p-type semiconductor, such as boron, which is often indicated using a p+ symbol). The second semiconductor region 106 is positioned above the first semiconductor region 104. The first type (e.g., n-type) is distinct from the second type (e.g., p-type). In some embodiments, the second semiconductor region 106 is positioned over the first semiconductor region 104.

The device includes a gate insulation layer 110 positioned above the second semiconductor region 106 and a gate 112 positioned above the gate insulation layer 110. In some embodiments, the gate insulation layer 110 is positioned over the second semiconductor region 106. In some embodiments, the gate insulation layer 110 is in contact with the second semiconductor region 106. In some embodiments, the gate 112 positioned over the gate insulation layer 110. In some embodiments, the gate 112 is in contact with the gate insulation layer 110.

The device also includes a source 114 electrically coupled with the second semiconductor region 106 and a drain 116 electrically coupled with the second semiconductor region 106.

The second semiconductor region 106 has a top surface 120 that is positioned toward the gate insulation layer 110. The second semiconductor region 106 also has a bottom surface 122 that is positioned opposite to the top surface 120 of the second semiconductor region 106. The second semiconductor region 106 has an upper portion 124 that includes the top surface 120 of the second semiconductor region 106. The second semiconductor region 106 also has a lower portion 126 that includes the bottom surface 122 of the second semiconductor region 106. The lower portion 126 is mutually exclusive with the upper portion 124. As used herein, the upper portion 124 and the lower portion 126 refer to different portions of the second semiconductor region 106. Thus, in some embodiments, there is no physical separation of the upper portion 124 and the lower portion 126. In some embodiments, the lower portion 126 refers to a portion of the second semiconductor region 106 that is not the upper portion 124. In some embodiments, the upper portion 124 has a thickness less than 1 nm, 2 nm, 3 nm, 4 nm, 5 nm, 6 nm, 7 nm, 8 nm, 9 nm, or 10 nm. In some embodiments, the upper portion 124 has a uniform thickness from the source 114 to the drain 116. In some embodiments, the upper portion 124 and the lower portion 126 have a same thickness at a horizontal location directly below the gate 112.

In some embodiments, the first type is an n-type and the second type is a p-type. For example, the first semiconductor region is doped with an n-type semiconductor and the source 114, the drain 116, and a channel between the source 114 and the drain 116 are doped with a p-type semiconductor, which is called a PMOS structure.

In some embodiments, the first type is a p-type and the second type is an n-type. For example, the first semiconductor region is doped with a p-type semiconductor and the source 114, the drain 116, and a channel between the source 114 and the drain 116 are doped with an n-type semiconductor, which is called an NMOS structure.

In some embodiments, the first semiconductor region 104 includes germanium. In some embodiments, the second semiconductor region 106 includes germanium. The direct band gap energy of germanium is around 0.8 eV at room temperature, which corresponds to a wavelength of 1550 nm. Thus, a semiconductor optical sensor device that includes germanium (e.g., in the first and second semiconductor regions) is more sensitive to shortwave infrared light than a semiconductor optical sensor device that includes silicon only (e.g., without germanium).

In some embodiments, the gate insulation layer 110 includes an oxide layer (e.g., $SiO_2$, $GeO_x$, $ZrO_x$, $HfO_x$, $Si_xN_y$, $Si_xO_yN_z$, $Ta_xO_y$, $Sr_xO_y$, or $Al_xO_y$). In some embodiments, the gate insulation layer 110 includes an oxynitride layer (e.g., SiON). In some embodiments, the gate insulation layer 110 includes a high-κ dielectric material, such as $HfO_2$, HfSiO, or $Al_2O_3$.

In some embodiments, the device includes a substrate insulation layer 108 positioned below the first semiconductor region 104. The substrate insulation layer includes one or more of: $SiO_2$, $GeO_x$, $ZrO_x$, $HfO_x$, $Si_xN_y$, $Si_xO_yN_z$, $Ta_xO_y$, $Sr_xO_y$, and $Al_xO_y$. In some embodiments, the substrate insulation layer 108 includes a high-κ dielectric material. In some embodiments, the first semiconductor region 104 is positioned over the substrate insulation layer 108. In some embodiments, the first semiconductor region 104 is in contact with the substrate insulation layer 108. In some embodiments, the substrate insulation layer 108 is positioned over the substrate 102 (e.g., a silicon substrate). In some embodiments, the substrate insulation layer 108 is in contact with the substrate 102.

In some embodiments, the device includes a third semiconductor region 108 that includes germanium doped with a dopant of the second type (e.g., p-type). The third semiconductor region 108 is positioned below the first semiconductor region 104.

In some embodiments, a doping concentration of the dopant of the second type in the second semiconductor region 106 is higher than a doping concentration of the dopant of the second type in the third semiconductor region 108. For example, the second semiconductor region 106 has a p+ doping (e.g., at a concentration of one dopant atom per ten thousand atoms or more) and the third semiconductor region 108 has a p doping (e.g., at a concentration of one dopant atom per hundred million atoms).

In some embodiments, the device includes a silicon substrate 102. For example, the third semiconductor region 108, the first semiconductor region 104, and the second semiconductor region 106 are formed over the silicon substrate 102.

In some embodiments, the gate 112 includes one or more of: polysilicon, amorphous silicon, silicon carbide, and metal. In some embodiments, the gate 112 consists of one or more of: polygermanium, amorphous germanium, polysilicon, amorphous silicon, silicon carbide, and metal.

In some embodiments, the second semiconductor region 106 extends from the source 114 to the drain 116.

In some embodiments, the first semiconductor region 104 extends from the source 114 to the drain 116.

In some embodiments, the gate insulation layer 110 extends from the source 114 to the drain 116.

In some embodiments, the second semiconductor region 106 has a thickness less than 100 nm. In some embodiments, the second semiconductor region 106 has a thickness between 1 nm than 100 nm. In some embodiments, the second semiconductor region 106 has a thickness between 5 nm than 50 nm. In some embodiments, the second semiconductor region 106 has a thickness between 50 nm than 100 nm. In some embodiments, the second semiconductor region 106 has a thickness between 10 nm than 40 nm. In some embodiments, the second semiconductor region 106 has a thickness between 10 nm than 30 nm. In some embodiments, the second semiconductor region 106 has a thickness between 10 nm than 20 nm. In some embodiments, the second semiconductor region 106 has a thickness between 20 nm than 30 nm. In some embodiments, the second semiconductor region 106 has a thickness between 30 nm than 40 nm. In some embodiments, the second semiconductor region 106 has a thickness between 40 nm than 50 nm.

In some embodiments, the first semiconductor region 104 has a thickness less than 1000 nm. In some embodiments, the first semiconductor region 104 has a thickness between 1 nm and 1000 nm. In some embodiments, the first semiconductor region 104 has a thickness between 5 nm and 500 nm. In some embodiments, the first semiconductor region 104 has a thickness between 500 nm and 1000 nm. In some embodiments, the first semiconductor region 104 has a thickness between 10 nm and 500 nm. In some embodiments, the first semiconductor region 104 has a thickness between 10 nm and 400 nm. In some embodiments, the first semiconductor region 104 has a thickness between 10 nm and 300 nm. In some embodiments, the first semiconductor region 104 has a thickness between 10 nm and 200 nm. In some embodiments, the first semiconductor region 104 has a thickness between 20 nm and 400 nm. In some embodiments, the first semiconductor region 104 has a thickness between 20 nm and 300 nm. In some embodiments, the first semiconductor region 104 has a thickness between 20 nm and 200 nm. In some embodiments, the first semiconductor region 104 has a thickness between 20 nm and 400 nm. In some embodiments, the first semiconductor region 104 has a thickness between 20 nm and 300 nm. In some embodiments, the first semiconductor region 104 has a thickness between 20 nm and 200 nm. In some embodiments, the first semiconductor region 104 has a thickness between 20 nm and 100 nm.

Figure 1B:
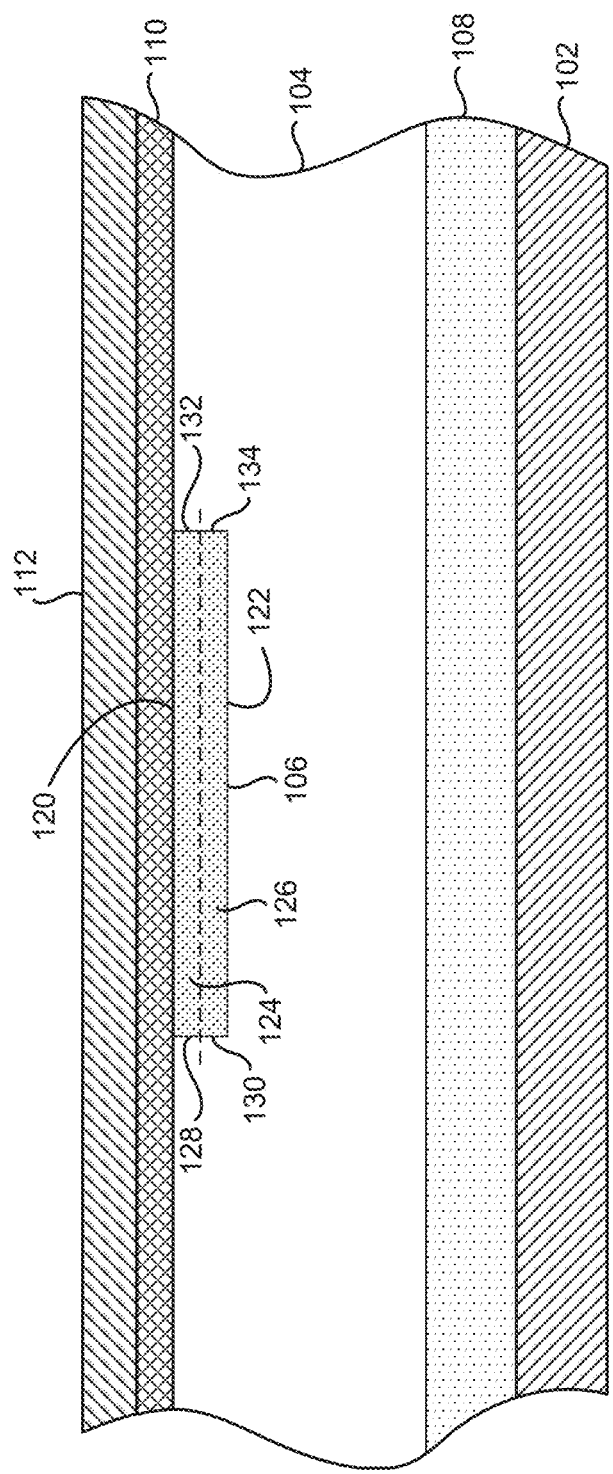
FIG. 1B is a partial cross-sectional view of the semiconductor optical sensor device illustrated in FIG. 1A, in accordance with some embodiments.

FIG. 1A also indicates plane AA upon which the view illustrated in FIG. 1B is taken.

FIG. 1B is a partial cross-sectional view of the semiconductor optical sensor device illustrated in FIG. 1A, in accordance with some embodiments.

In FIG. 1B, the first semiconductor region 104, the second semiconductor region 106, the gate insulation layer 110, the gate 112, the substrate insulation layer or third semiconductor region 108, and the substrate 102 are illustrated. For brevity, the description of these elements are not repeated herein.

As shown in FIG. 1B, the first semiconductor region 104 is in contact with both the upper portion 124 and the lower portion 126 of the second semiconductor region 106. The first semiconductor region 104 is in contact with the upper portion 124 of the second semiconductor region 106 at least at a location positioned under the gate 112. In some embodiments, the first semiconductor region 104 is in contact with the upper portion 124 of the second semiconductor region 106 at least at a location positioned directly under the gate 112. In some embodiments, the first semiconductor region 104 is in contact with the top surface 120 of the second semiconductor region 106 at least on an edge of the top surface 120 of the second semiconductor region 106. In some embodiments, the first semiconductor region 104 is in contact with the top surface 120 of the second semiconductor region 106 at least on an edge of the top surface 120 of the second semiconductor region 106 at a location directly under the gate 112.

In some embodiments, the second semiconductor region 106 has a first lateral surface (e.g., a combination of a lateral surface 128 of the upper portion 124 and a lateral surface 130 of the lower portion 126) that extends from the source 114 (FIG. 1A) to the drain 116 (FIG. 1A) and is distinct from the top surface 120 and the bottom surface 122. The second semiconductor region 106 has a second lateral surface (e.g., a combination of a lateral surface 132 of the upper portion 124 and a lateral surface 134 of the lower portion 126) that extends from the source 114 (FIG. 1A) to the drain 116 (FIG. 1A) and is distinct from the top surface 120 and the bottom surface 122. The first lateral surface and the second lateral surface are located on opposite sides of the second semiconductor region 106. In some embodiments, the first semiconductor region 104 is in contact with the upper portion 124 of the second semiconductor region 106 through a portion 128 of the first lateral surface. In some embodiments, the first semiconductor region 104 is in contact with the upper portion 124 of the second semiconductor region 106 through a portion 132 of the second lateral surface. In some embodiments, the first semiconductor region 104 is in contact with the upper portion 124 of the second semiconductor region 106 through a portion 128 of the first lateral surface at a location directly under the gate 112 and the first semiconductor region 104 is also in contact with the upper portion 124 of the second semiconductor region 106 through a portion 132 of the second lateral surface at a location directly under the gate 112.

In some embodiments, the lateral surface 128 of the upper portion 124 has a thickness less than 1 nm, 2 nm, 3 nm, 4 nm, 5 nm, 6 nm, 7 nm, 8 nm, 9 nm, or 10 nm. In some embodiments, the lateral surface 132 of the upper portion 124 has a thickness less than 1 nm, 2 nm, 3 nm, 4 nm, 5 nm, 6 nm, 7 nm, 8 nm, 9 nm, or 10 nm. In some embodiments, the lateral surface 128 of the upper portion 124 has a thickness less a thickness of the lateral surface 130 of the lower portion 126. In some embodiments, the lateral surface 132 of the upper portion 124 has a thickness less a thickness of the lateral surface 134 of the lower portion 126.

Figure 2A:
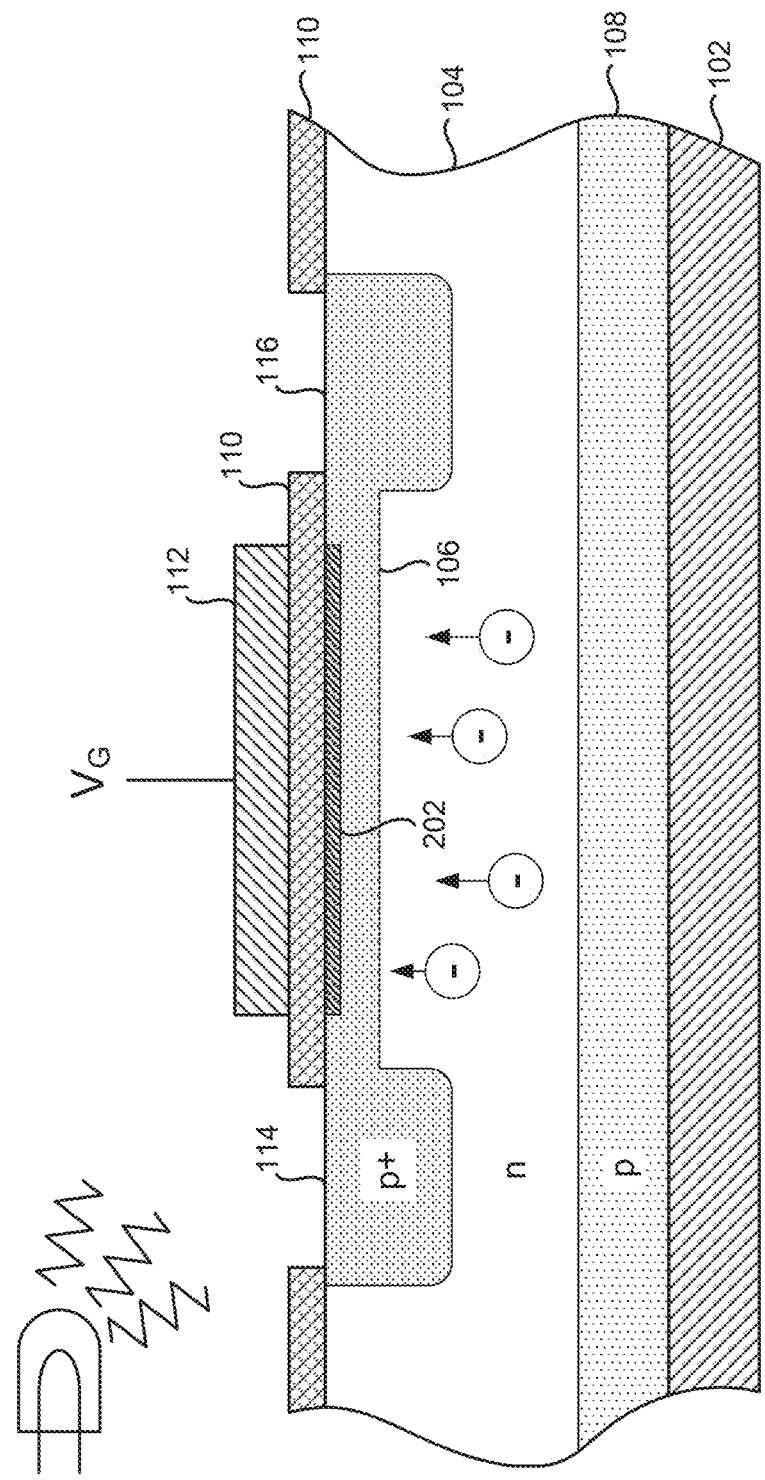
FIG. 2A is a schematic diagram illustrating an operation of a semiconductor optical sensor device in accordance with some embodiments.
Figure 2B:
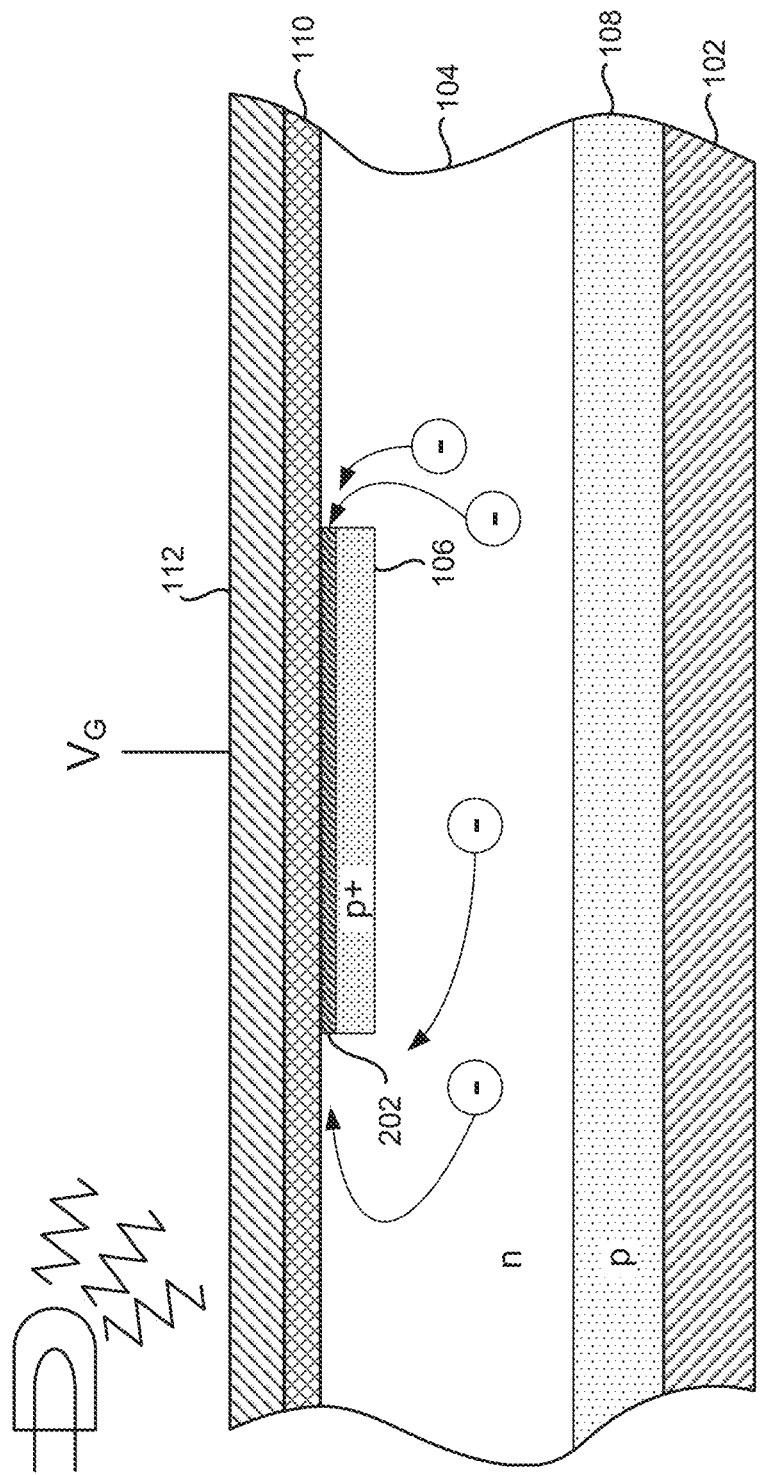
FIG. 2B is a schematic diagram illustrating the operation of the semiconductor optical sensor device illustrated in FIG. 2A, in accordance with some embodiments.

FIGS. 2A-2B are used below to illustrate operational principles of the semiconductor optical sensor device in accordance with some embodiments. However, FIGS. 2A-2B and the described principles are not intended to limit the scope of claims.

FIG. 2A is a schematic diagram illustrating an operation of a semiconductor optical sensor device in accordance with some embodiments.

The device illustrated in FIG. 2A is similar the device illustrated in FIG. 1A. For brevity, the description of the elements described above with respect to FIG. 1A is not repeated herein.

In FIG. 2A, the first semiconductor region 104 is doped with an n-type semiconductor. The second semiconductor region 106 is heavily doped with a p-type semiconductor. The third semiconductor region 108 is doped with a p-type semiconductor. In some embodiments, the third semiconductor region 108 is lightly doped with the p-type semiconductor.

While voltage $V_G$ is applied to the gate 112, a potential well 202 is formed between the second semiconductor region 106 and the gate insulation layer 110. While the device (in particular, the first semiconductor region 104) is exposed to light, photo-generated carriers are generated. While voltage $V_G$ is applied to the gate 112, the photo-generated carriers migrate to the potential well 202.

FIG. 2B is a schematic diagram illustrating the operation of the semiconductor optical sensor device illustrated in FIG. 2A, in accordance with some embodiments.

FIG. 2B is similar to FIG. 2A. For brevity, the description of the same elements described above with respect to FIG. 1B is not repeated herein.

In FIG. 2B, the migration path of the photo-generated carriers to the potential well 202 located between the second semiconductor region 106 and the gate insulation layer 110 is indicated. The photo-generated carriers get into the potential well 202 through lateral surfaces of second semiconductor region 106. In some embodiments, at least a portion of the photo-generated carriers directly pass through a bottom surface of the second semiconductor region 106 to reach the potential well 202. This is possible because the second semiconductor region 106 is thin and the barrier between the second semiconductor region 106 and the potential well 202 is low (e.g., less than band gap of Ge). When the photo-generated carriers migrate through the bottom surface of the second semiconductor region 106, carrier recombination may take place in the second semiconductor region 106.

This direct contact between the first semiconductor region 104 and the potential well 202 significantly increases migration of the photo-generated carriers from the first semiconductor region 104 to the potential well 202. Thus, a thick first semiconductor region 104 may be used for increasing the quantum efficiency, while the photo-generated carriers are effectively transported to the potential well 202 for increasing the on/off signal modulation.

In the absence of an exposure to light, the device would have a certain drain current (called herein $I_{off}$). However, when the device is exposed to light, the photo-generated carriers modulate the drain current (e.g., the drain current increases to $I_{on}$).

Figure 3:
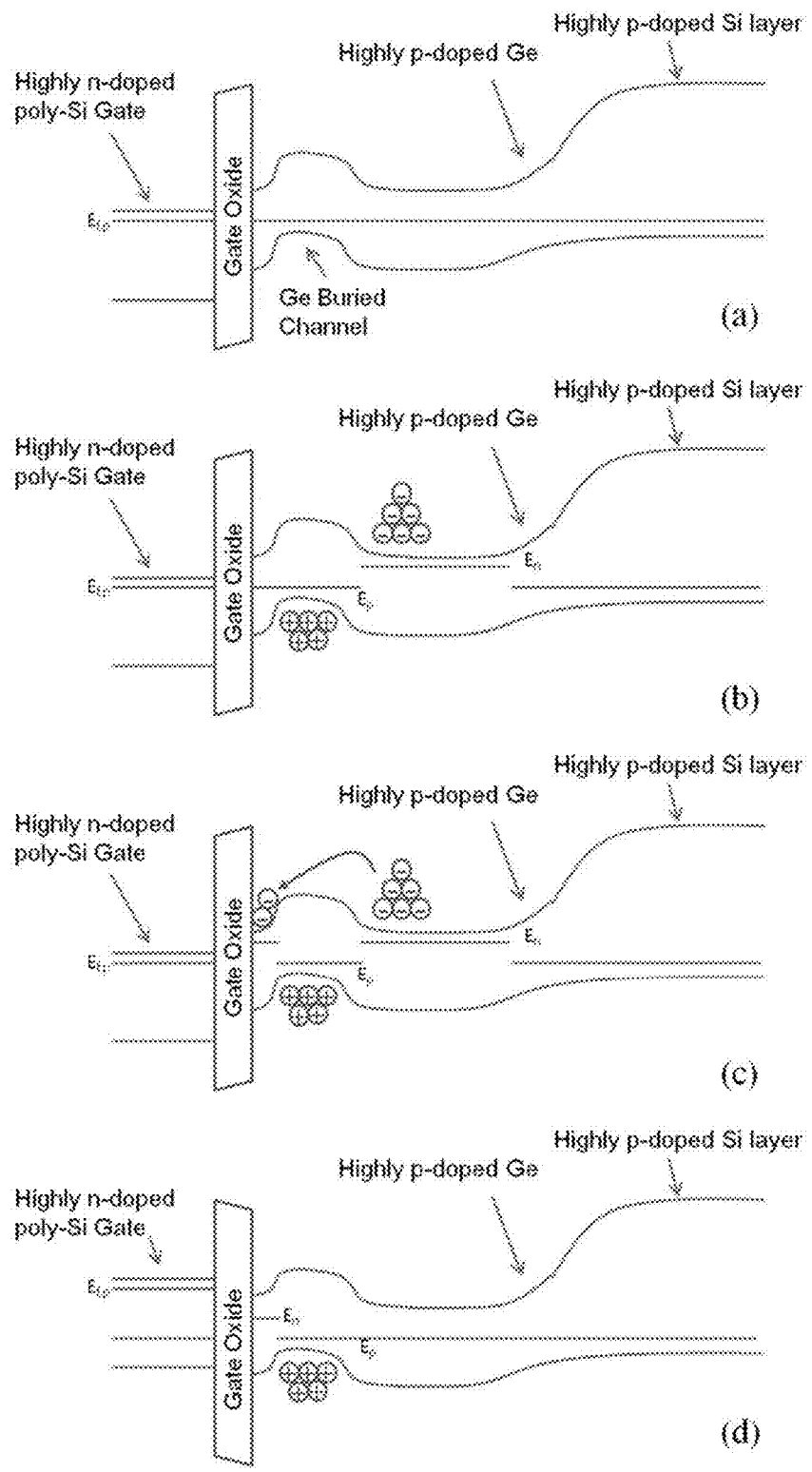
FIG. 3 illustrates exemplary band diagrams in accordance with some embodiments.

FIG. 3 illustrates exemplary band diagrams in accordance with some embodiments. Although FIG. 3 is used to illustrate operational principles of the semiconductor optical sensor device, FIG. 3 and the described principles are not intended to limit the scope of claims.

The band diagrams in FIG. 3 represent electron energy levels from the gate of the semiconductor optical sensor device to the substrate of the semiconductor optical sensor device.

A GCMD can be represented as having a small capacitance and a large capacitance connected around a channel.

The band diagram (a) represents that the device is in the off state.

The band diagram (b) represents that the incident light is absorbed in the substrate region, and carriers are photo-generated in the small capacitance. There is a quasi-Fermi level split in the buried hole channel and substrate.

The band diagram (c) represents that the photo-generated carriers from the low capacitance region are transferred to the large capacitance region (oxide-surface interface) automatically with a proper gate bias. The transferred photo-generated carriers in the oxide-surface interface reduce band bending between the source/drain and the buried hole channel, ultimately increasing the drain current.

The band of the channel with incident light is similar to the band with a lower gate voltage, which is represented in the band diagram (d).

Figure 4A:
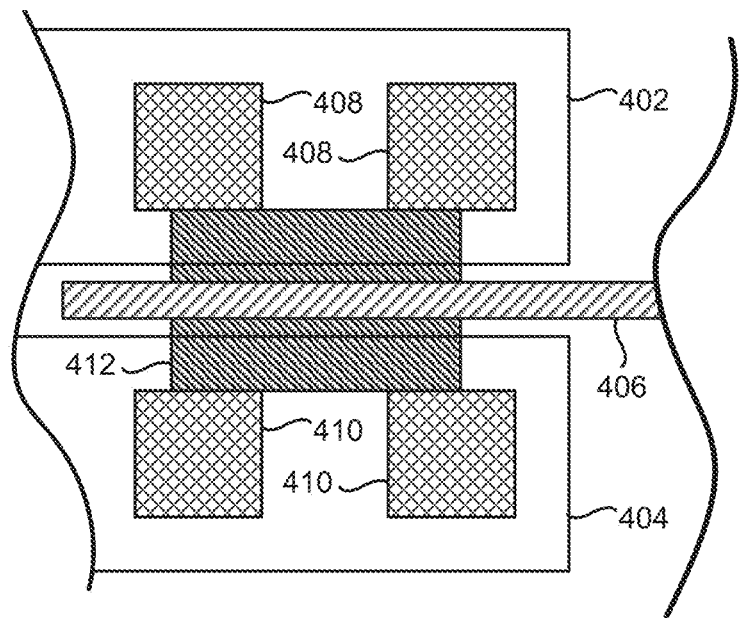
FIG. 4A is a schematic diagram illustrating a single channel configuration of a semiconductor optical sensor device in accordance with some embodiments.
Figure 4B:
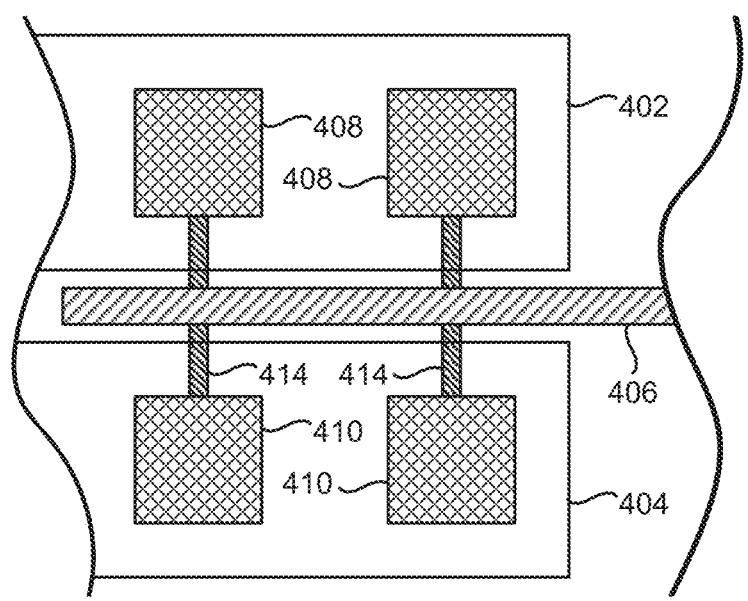
FIG. 4B is a schematic diagram illustrating a multi-channel configuration of a semiconductor optical sensor device in accordance with some embodiments.

FIGS. 4A and 4B are schematic diagrams illustrating a single channel configuration and a multi-channel configuration of a semiconductor optical sensor device. The schematic diagrams in FIGS. 4A and 4B are based on top-down views of the semiconductor optical sensor device. However, it should be noted that the schematic diagrams in FIGS. 4A and 4B are used to represent relative sizes and positions of various elements and that the schematic diagrams in FIGS. 4A and 4B are not cross-sectional views.

FIG. 4A is a schematic diagram illustrating a single channel configuration of a semiconductor optical sensor device in accordance with some embodiments.

FIG. 4A illustrates that the device has a gate 406, a source 402, and a drain 404. The device also includes a channel 412 that extends from the source 402 to the drain 404. The channel 412 is typically defined by the second semiconductor region. For example, the shape of the channel 412 is determined by a pattern of ion implantation in forming the second semiconductor region. The source 402 has multiple contacts 408 with the channel 412 and the drain 404 has multiple contacts 410 with the channel 412.

FIG. 4B is a schematic diagram illustrating a multi-channel configuration of a semiconductor optical sensor device in accordance with some embodiments.

FIG. 4B is similar to FIG. 4A except that the device has multiple channels 414 between the source 402 and the drain 404. In some embodiments, the second semiconductor region defines multiple channels 414 between the source 402 and the drain 404. Each channel 414 in FIG. 4B connects a single contact 408 of the source 402 and a single contact 410 of the drain 404. Thus, a width of the channel 414 in FIG. 4B is less than a width of the channel 412 in FIG. 4A. The reduced width of a channel is believed to facilitate a transfer of a photo-generated carrier to a large capacitance region (e.g., an interface of the second semiconductor region and the gate insulation layer) of the device.

Figure 5:
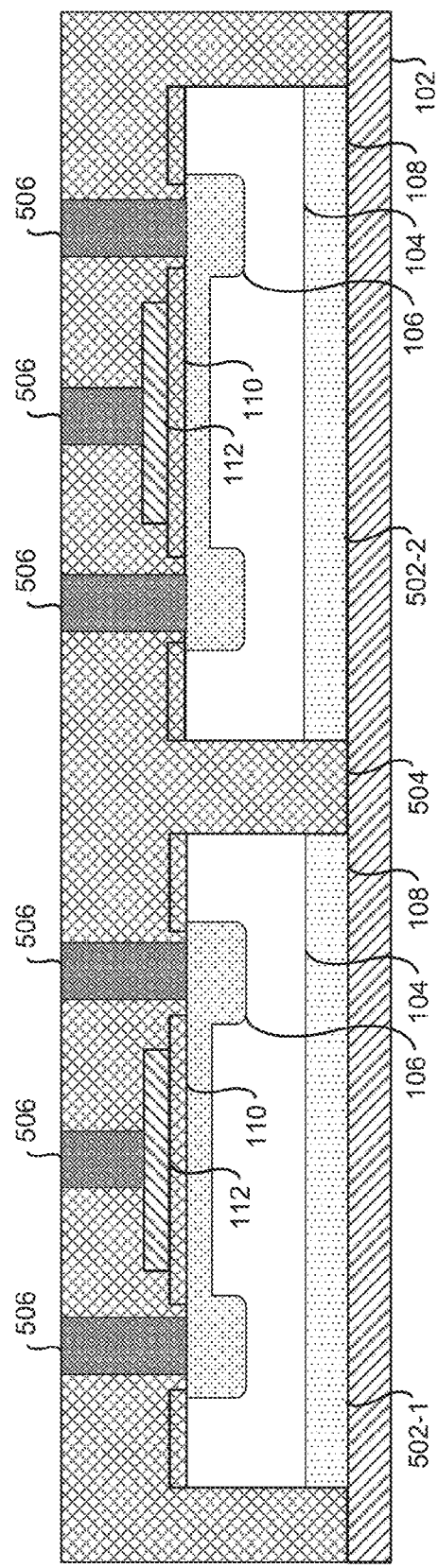
FIG. 5 is a partial cross-sectional view of semiconductor optical sensor devices in accordance with some embodiments.

FIG. 5 is a partial cross-sectional view of semiconductor optical sensor devices in accordance with some embodiments.

FIG. 5 illustrates that a plurality of semiconductor optical sensor devices (e.g., devices 502-1 and 502-2) are formed on a common substrate. The multiple devices form a sensor array. Although FIG. 5 illustrates two semiconductor optical sensor devices, the sensor array may include more than two semiconductor optical sensor devices. In some embodiments, the sensor array includes a two-dimensional array of semiconductor optical sensor devices.

FIG. 5 also illustrates that vias 506 are formed to connect the gate 112, the source, and the drain of the devices 502-1 and 502-2.

In some embodiments, the plurality of devices (e.g., devices 502-1 and 502-2) has the first semiconductor region 104 on a common plane. In some embodiments, the first semiconductor region 104 of the plurality of devices is formed concurrently (e.g., using epitaxial growth of the first semiconductor region 104).

In some embodiments, the plurality of devices (e.g., devices 502-1 and 502-2) has the second semiconductor region 106 on a common plane. In some embodiments, the second semiconductor region 106 of the plurality of devices is formed concurrently (e.g., using ion implantation).

In some embodiments, the plurality of devices (e.g., devices 502-1 and 502-2) has the third semiconductor region 108 on a common plane. In some embodiments, the third semiconductor region 108 of the plurality of devices is formed concurrently (e.g., using epitaxial growth of germanium islands).

In some embodiments, the plurality of devices is separated by one or more trenches. For example, the device 502-1 and the device 502-2 are separate by a trench. In some embodiments, the one or more trenches are filled with an insulator. In some embodiments, a trench is a shallow trench isolator.

In some embodiments, the plurality of devices is positioned on separate germanium islands formed on the common silicon substrate 102. For example, in some embodiments, third semiconductor regions 108 (e.g., germanium islands) are formed on the substrate 102 and the rest of devices 502-1 and 502-2 are formed over the third semiconductor regions 108.

In some embodiments, the sensor array includes a passivation layer over the plurality of devices. For example, the passivation layer 504 is positioned over the devices 502-1 and 502-2 in FIG. 5.

In some embodiments, the sensor array includes a passivation layer 504 between the plurality of devices. For example, the passivation layer 504 is positioned between the devices 502-1 and 502-2 in FIG. 5.

Figure 6:
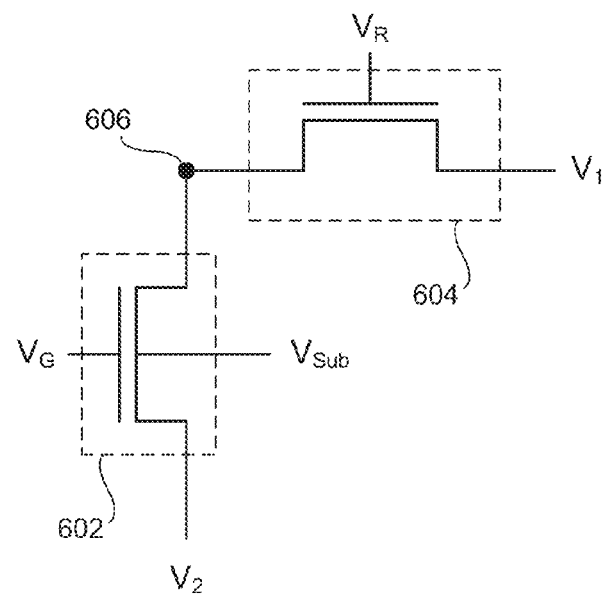
FIG. 6 illustrates an exemplary sensor circuit in accordance with some embodiments.

FIG. 6 illustrates an exemplary sensor circuit in accordance with some embodiments.

The sensor circuit includes a photo-sensing element 602. The photo-sensing element 602 has a source terminal, a gate terminal, a drain terminal, and a body terminal. The sensor circuit also includes a selection transistor 604 having a source terminal, a gate terminal, and a drain terminal. In some embodiments, the drain terminal of the selection transistor 604 is electrically coupled (e.g., at a point 606) with the source terminal of the photo-sensing element 602. In some embodiments, the source terminal of the selection transistor 604 is electrically coupled (e.g., at the point 606) with the drain terminal of the photo-sensing element 602.

In some embodiments, the photo-sensing element is a GCMD (e.g., the device 100, FIG. 1A).

In some embodiments, the source terminal or the drain terminal, of the photo-sensing element 602, that is not electrically coupled with the source terminal or the drain terminal of the selection transistor 604 is connected to a ground. For example, $V_2$ is connected to a ground.

In some embodiments, the source terminal or the drain terminal, of the photo-sensing element 602, that is electrically coupled with the source terminal or the drain terminal of the selection transistor 604 is not connected to a ground. For example, the point 606 is not connected to a ground.

In some embodiments, the source terminal or the drain terminal, of the photo-sensing element 602, that is not electrically coupled with the source terminal or the drain terminal of the selection transistor 604 is electrically coupled with a first voltage source. For example, $V_2$ is connected to the first voltage source.

In some embodiments, the first voltage source provides a first fixed voltage, such as a voltage that is distinct from the ground.

In some embodiments, the source terminal or the drain terminal, of the selection transistor 604, that is not electrically coupled with the source terminal or the drain terminal of the photo-sensing element 620 is electrically coupled with a second voltage source. For example, $V_1$ is connected to the second voltage source. In some embodiments, the second voltage source provides a second fixed voltage.

In some embodiments, the sensor circuit includes no more than two transistors, the two transistors including the selection transistor 604. In some embodiments, the sensor circuit also includes a gate control transistor that is electrically coupled to the gate of the photo-sensing element.

In some embodiments, the sensor circuit includes no more than one transistor, the one transistor being the selection transistor 604.

The sensor circuit in FIG. 6 is called herein one-transistor modified active-pixel sensor (1T-MAPS), because the sensor circuit includes a single transistor and a modified active-pixel sensor. The difference between 1T-MAPS and a conventional sensor circuit called three-transistor active-pixel sensor (3T-APS) is described below with respect to FIGS. 7A-7B.

Figures 7A, 7B:
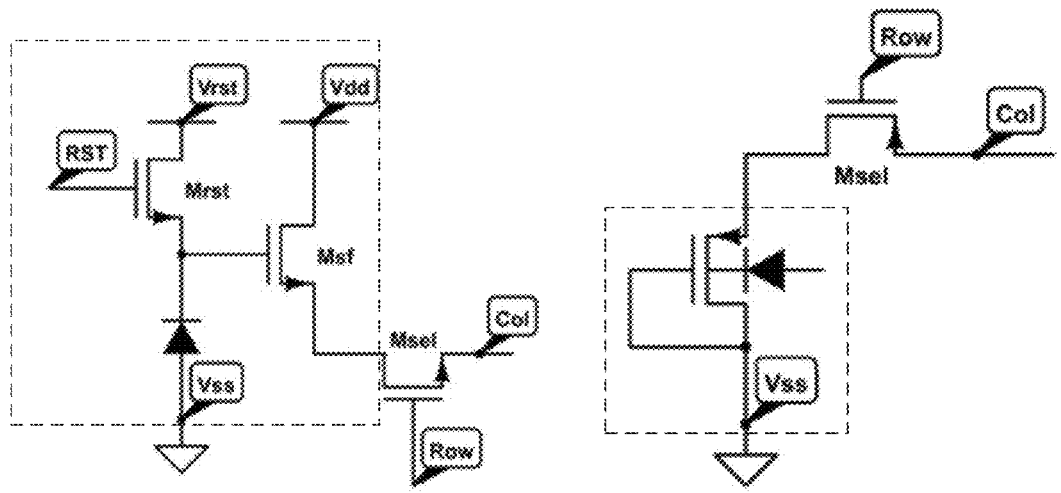
FIG. 7A illustrates an exemplary 3T-APS circuit in accordance with some embodiments.
FIG. 7B illustrates an exemplary 1T-MAPS circuit in accordance with some embodiments.

FIG. 7A illustrates an exemplary 3T-APS circuit in accordance with some embodiments.

The 3T-APS circuit includes a photo-sensing element (e.g., a photodiode) and three transistors: a reset transistor Mrst, a source-follower transistor Msf, and a select transistor Msel.

The reset transistor Mrst works as a reset switch. For example, Mrst receives a gate signal RST, which allows a reset voltage, Vrst, to be provided to the photo-sensing element to reset the photo-sensing element.

The source-follower transistor Msf acts as a buffer. For example, Msf receives an input (e.g., a voltage input) from the photo-sensing element, which allows a high voltage Vdd to be output to the source of the select transistor Msel.

The select transistor Msel works as a readout switch. For example, Msel receives a row selection signal ROW, which allows an output from the source-follower transistor Msf to be provided to a column line.

FIG. 7B illustrates an exemplary 1T-MAPS circuit in accordance with some embodiments.

As explained above with respect to FIG. 6, the 1T-MAPS circuit includes one photo-sensing element (e.g., GCMD) and one transistor, namely a select transistor Msel.

The select transistor Msel receives a row selection signal ROW, which allows a current from the column line to flow to an input of the photo-sensing element. Alternatively, the row selection signal ROW, provided to the select transistor Msel, allows a current from the photo-sensing element to flow to the column line. In some embodiments, the column line is set to a fixed voltage.

In some embodiments, the 1T-MAPS circuit does not require a reset switch, because photo-generated carriers stored in the GCMD dissipate in a short period of time (e.g., 0.1 second).

A comparison of the 3T-APS circuit illustrated in FIG. 7A and the 1T-MAPS circuit illustrated in FIG. 7B shows that the 1T-MAPS circuit has a much smaller size than the 3T-APS circuit. Thus, a 1T-MAPS circuit is more cost advantageous than a 3T-APS circuit made of a same material. In addition, due to the smaller size, more 1T-MAPS circuits can be placed on a same area of a die than 3T-APS circuits, thereby increasing a number of pixels on the die.

FIGS. 8A-8H illustrate exemplary sensor circuits in accordance with some embodiments. In FIGS. 8A-8H, a switch symbol represents a select transistor.

FIGS. 8A-8D illustrate exemplary sensor circuits that include a PMOS-type GCMD.

Figure 8A:
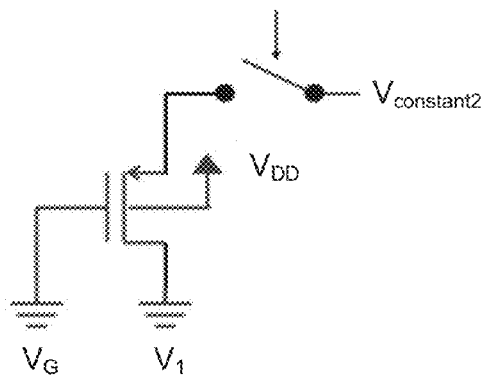
FIGS. 8A-8H illustrate exemplary sensor circuits in accordance with some embodiments.

In FIG. 8A, the gate of the GCMD is connected to a ground $V_G$, and the drain of the GCMD is connected to a low voltage source $V_1$ (e.g., ground). The source of the GCMD is connected to a switch (or a select transistor), which is connected to a fixed voltage, $V_{constant2}$. In some embodiments, the body is connected to a high voltage source $V_{DD}$.

Figure 8B:
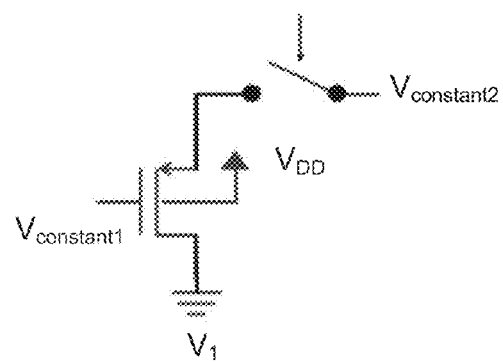

In FIG. 8B, the gate of the GCMD is connected to a fixed voltage $V_{constant1}$, and the drain of the GCMD is connected to a low voltage source $V_1$ (e.g., ground). The source of the GCMD is connected to a switch (or a select transistor), which is connected to a fixed voltage, $V_{constant2}$. In some embodiments, the body is connected to a high voltage source $V_{DD}$.

Figure 8C:
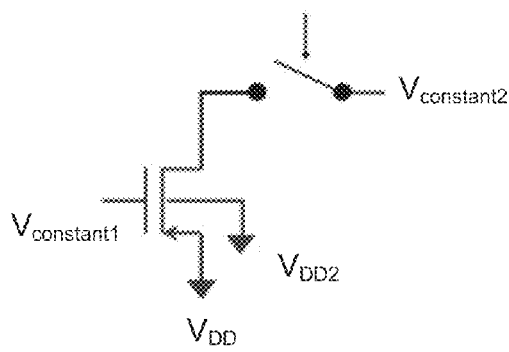

In FIG. 8C, the gate of the GCMD is connected to a fixed voltage $V_{constant1}$, and the source of the GCMD is connected to a high voltage source $V_{DD}$. The drain of the GCMD is connected to a switch (or a select transistor), which is connected to a fixed voltage, $V_{constant2}$. In some embodiments, the body is connected to a high voltage source $V_{DD2}$.

Figure 8D:
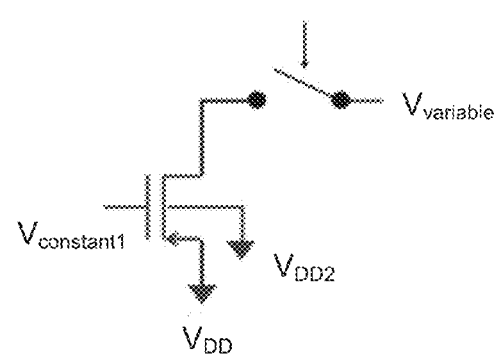

In FIG. 8D, the gate of the GCMD is connected to a fixed voltage $V_{constant}$, and the source of the GCMD is connected to a high voltage source $V_{DD}$. The drain of the GCMD is connected to a switch (or a select transistor), which is connected to a variable voltage, $V_{variable}$. In some embodiments, the body is connected to a high voltage source $V_{DD2}$.

FIGS. 8E-8H illustrate exemplary sensor circuits that include NMOS type GCMD.

Figure 8E:
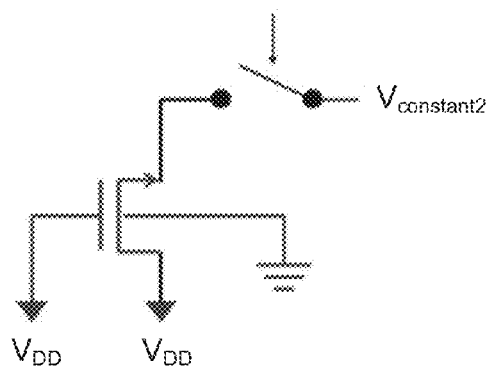

In FIG. 8E, the gate and the drain of the GCMD are connected to a high voltage source $V_{DD}$. The source of the GCMD is connected to a switch (or a select transistor), which is connected to a fixed voltage, $V_{constant2}$. In some embodiments, the body is connected to a ground.

Figure 8F:
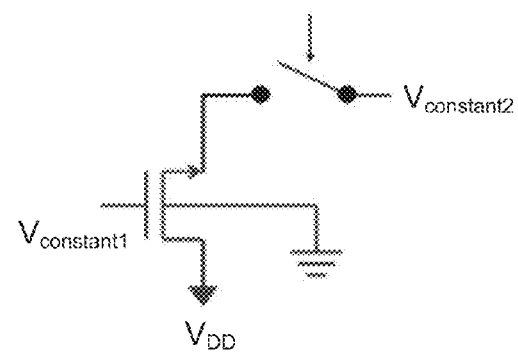

In FIG. 8F, the gate of the GCMD is connected to a fixed voltage $V_{constant}$, and the drain of the GCMD is connected to a high voltage source $V_{DD}$. The source of the GCMD is connected to a switch (or a select transistor), which is connected to a fixed voltage, $V_{constant2}$. In some embodiments, the body is connected to a ground.

Figure 8G:
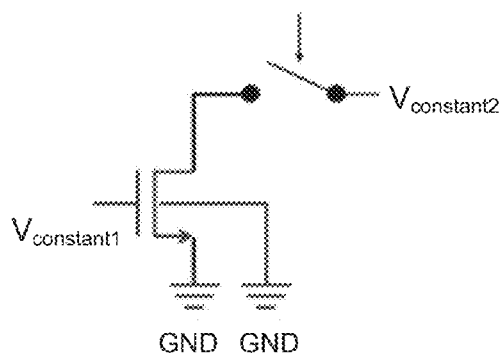

In FIG. 8G, the gate of the GCMD is connected to a fixed voltage $V_{constant}$, and the source of the GCMD is connected to a ground. The drain of the GCMD is connected to a switch (or a select transistor), which is connected to a fixed voltage, $V_{constant2}$. In some embodiments, the body is connected to a ground.

Figure 8H:
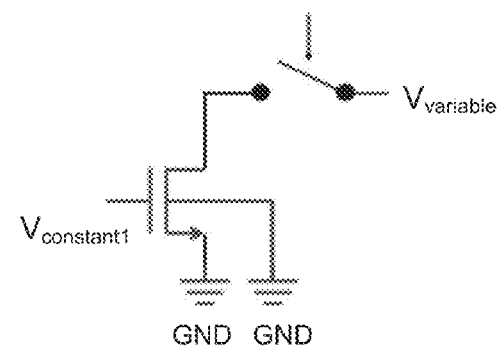

In FIG. 8H, the gate of the GCMD is connected to a fixed voltage $V_{constant}$, and the source of the GCMD is connected to a ground. The drain of the GCMD is connected to a switch (or a select transistor), which is connected to a variable voltage, $V_{variable}$. In some embodiments, the body is connected to a ground.

In FIGS. 8A-8H, the drain current in the GCMD changes depending on whether the GCMD is exposed to light. Thus, in some embodiments, the GCMD is modeled as a current source that provides $I_{on}$ when the GCMD is exposed to light and provide $I_{off}$ when the GCMD is not exposed to light.

Figure 9A:
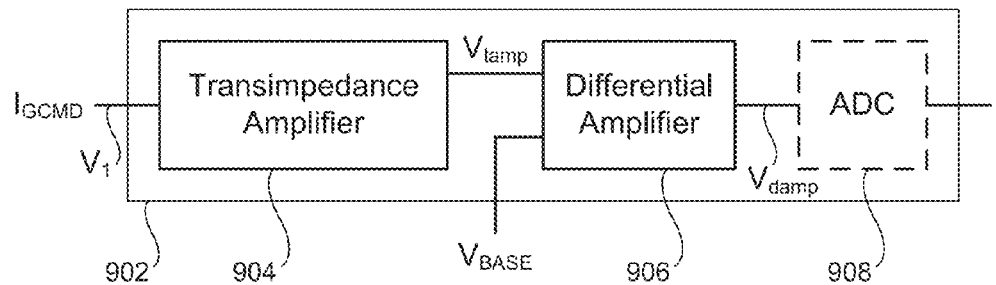
FIGS. 9A-9C illustrate exemplary converter circuits in accordance with some embodiments.
Figure 9B:
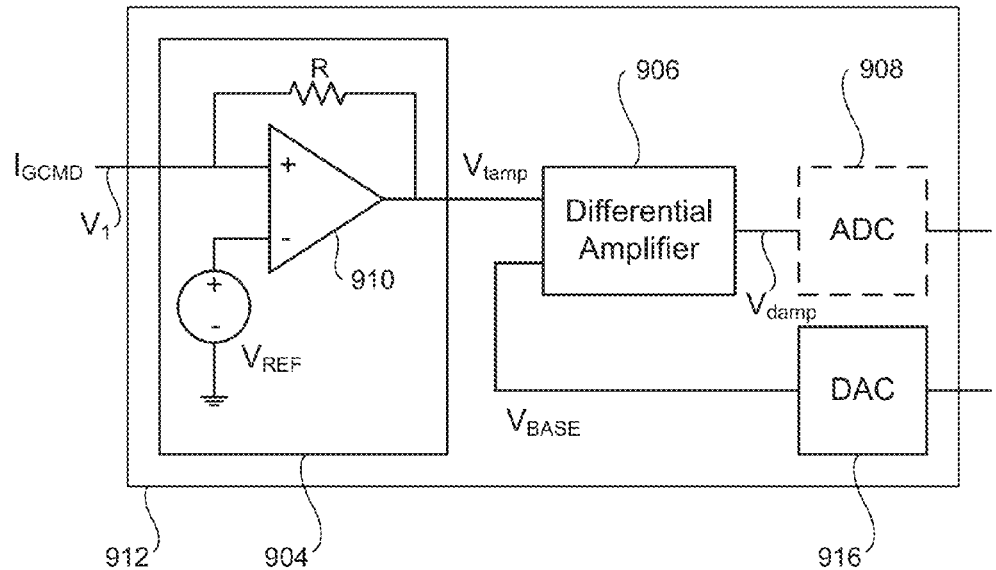
Figure 9C:
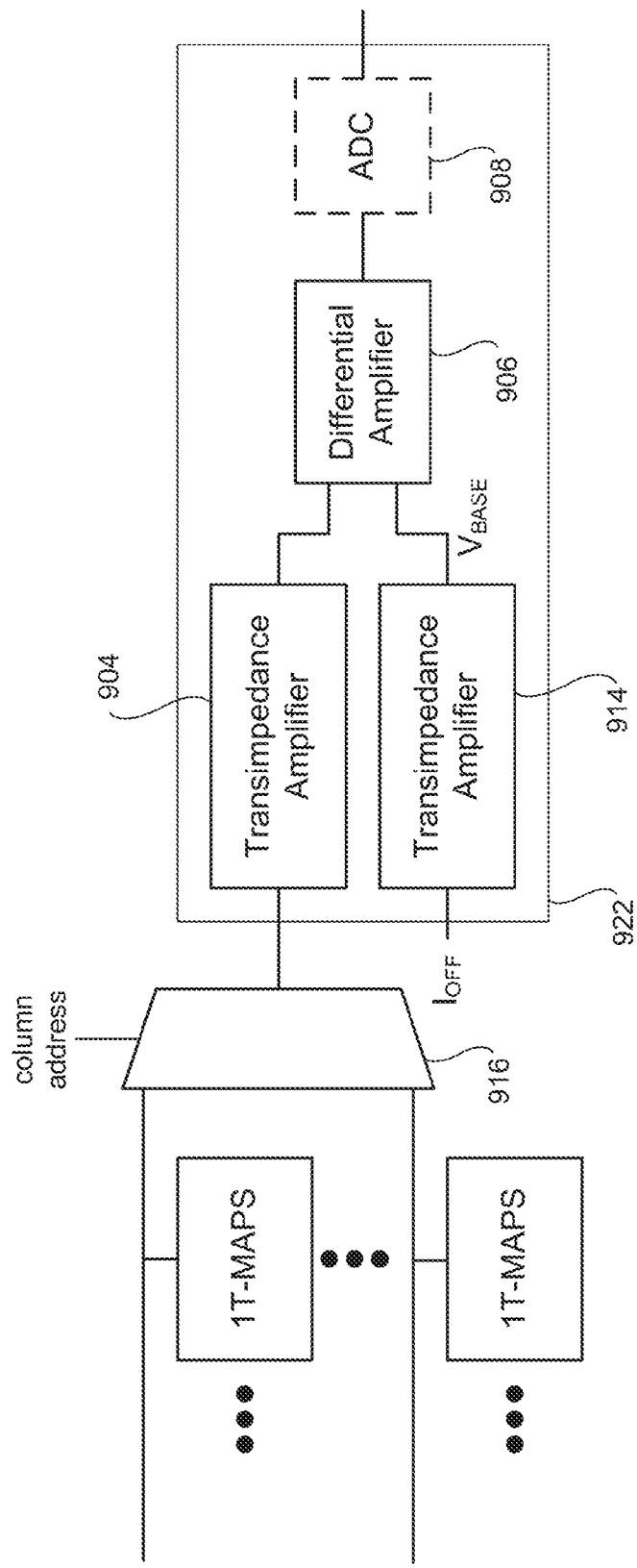

FIGS. 9A-9C illustrate exemplary converter circuits in accordance with some embodiments.

FIG. 9A illustrates an exemplary converter circuit 902 in accordance with some embodiments.

The converter circuit 902 includes a first transimpedance amplifier 904 (e.g., an operational amplifier) that has an input terminal (e.g., an input terminal receiving $I_{GCMD}$ from the photo-sensing element, such as the GCMD) electrically coupled with the source terminal or the drain terminal of the selection transistor of a first sensor circuit (e.g., the sensor circuit in FIG. 6), that is not electrically coupled with the source terminal or the drain terminal of the photo-sensing element (e.g., the terminal having a voltage $V_1$ in FIG. 6). The first transimpedance amplifier 904 is configured to convert a current input (e.g., $I_{GCMD}$) from the photo-sensing element into a voltage output (e.g., $V_{tamp}$).

The converter circuit 902 also includes a differential amplifier 906 having two input terminals. A first input terminal of the two input terminals is electrically coupled with the voltage output (e.g., $V_{tamp}$) of the first transimpedance amplifier 904 and a second input terminal of the two input terminals is electrically coupled with a voltage source that is configured to provide a voltage (e.g., $V_{BASE}$) corresponding to a base current provided by the photo-sensing element. The differential amplifier is configured to output a voltage (e.g., $V_{damp}$) based on a voltage difference between the voltage output (e.g., $V_{tamp}$) and the voltage provided by the voltage source (e.g., $V_{BASE}$). In some embodiments, the differential amplifier 906 includes an operational amplifier. In some embodiments, the differential amplifier 906 includes a transistor long tailed pair.

In some embodiments, the converter circuit 922 includes an analog-to-digital converter 908 electrically coupled to an output of the differential amplifier 906 (e.g., $V_{tamp}$), the analog-to-digital converter configured to convert the output (e.g., a voltage output) of the differential amplifier 906 (e.g., $V_{tamp}$) into a digital signal.

FIG. 9B illustrates an exemplary converter circuit 912 in accordance with some embodiments. The converter circuit 912 is similar to the converter circuit 902 illustrated in FIG. 9A. Some of the features described with respect to FIG. 9A are applicable to the converter circuit 912. For brevity, the description of such features is not repeated herein.

FIG. 9B illustrates that, in some embodiments, the first transimpedance amplifier 904 in the converter circuit 912 includes an operational amplifier 910. The operational amplifier 910 has a non-inverting input terminal that is electrically coupled with the source terminal or the drain terminal of the selection transistor of the first sensor circuit (E.g., the terminal having a voltage $V_1$ in FIG. 6). The operational amplifier 910 also has an inverting input terminal that is electrically coupled with a reference voltage source that provides a reference voltage $V_{REF}$. The operational amplifier 910 has an output terminal, and a resistor with a resistance value R is electrically coupled to the non-inverting input terminal on a first end of the resistor and to the output terminal on the second end, opposite to the first end, of the resistor.

In operation, the voltage output $V_{tamp}$ is determined as follows:

$$V_{tamp} = V_{REF} + R \cdot I_{GCMD}$$

Furthermore, the current from the GCMD can be modeled as follows:

$$I_{GCMD} = I_{off} \quad \text{(no light)}$$

$$I_{GCMD} = I_\Delta + I_{off} \quad \text{(light)}$$

In some embodiments, the base current corresponds to a current provided by the photo-sensing element while the photo-sensing element receives substantially no light (e.g., $I_{off}$). When $I_{off}$ is converted by the first transimpedance amplifier 904, a corresponding voltage $V_{BASE}$ is determined as follows:

$$V_{BASE} = V_{REF} + R \cdot I_{off}$$

Then, the voltage difference between $V_{tamp}$ and $V_{BASE}$ is as follows:

$$V_{tamp} - V_{BASE} = R \cdot I_\Delta$$

The voltage output $V_{damp}$ of the differential amplifier 906 is as follows:

$$V\text{damp} = A \cdot R \cdot I_\Delta$$

where A is a differential gain of the differential amplifier 906. In some embodiments, the differential gain is one of: one, two, three, five, ten, twenty, fifty, and one hundred.

FIG. 9B also illustrates that, in some embodiments, the voltage source is a digital-to-analog converter (DAC) 916. For example, the DAC 916 is configured to provide VBASE.

FIG. 9C illustrates an exemplary converter circuit 922 in accordance with some embodiments. The converter circuit 922 is similar to the converter circuit 902 illustrated in FIG. 9A and the converter circuit 912 illustrated in FIG. 9B. Some of the features described with respect to FIGS. 9A and 9B are applicable to the converter circuit 922. For example, in some embodiments, the converter circuit 922 includes the digital-to-analog converter 916. In some embodiments, the first transimpedance amplifier 904 includes an operational amplifier 910. For brevity, the description of such features is not repeated herein.

FIG. 9C illustrates that the voltage source (that provides VBASE) is a second transimpedance amplifier 914 having an input terminal electrically coupled with a second sensor circuit that is distinct from the first sensor circuit. In some embodiments, the input terminal of the second transimpedance amplifier 914 is electrically coupled with the source terminal or the drain terminal of the selection transistor of the second sensor circuit. In some embodiments, the photo-sensing element of the second sensor circuit is optically covered so that the photo-sensing element of the second sensor circuit is prevented from receiving light. Thus, the second sensor circuit provides Ioff to the second transimpedance amplifier 914. The second transimpedance amplifier 914 converts Ioff to VBASE. In some embodiments, the second transimpedance amplifier 914 includes an operational amplifier.

In some embodiments, the first transimpedance amplifier 904 is configured to electrically couple with a respective sensor circuit of a plurality of sensor circuits through a multiplexer. For example, the converter circuit 922 is coupled to a multiplexer 916. The multiplexer receives a column address to select one of a plurality of column lines. Each column line is connected to multiple sensor circuits, each having a selection transistor that receives a ROW signal. Thus, based on a column address and a ROW signal, one sensor circuit in a two-dimensional array of sensor circuits is selected, and a current output from the selected sensor circuit is provided to the first transimpedance amplifier 904 through the multiplexer 916.

Although FIGS. 9A-9C illustrate selected embodiments, it should be noted that a converter circuit may include a subset of the features described in FIGS. 9A-9C (e.g., the converter circuit 922 may be coupled with the multiplexer 916 without having the second transimpedance amplifier 914). In some embodiments, a converter circuit includes additional features not described with respect to FIGS. 9A-9C.

Figure 10:
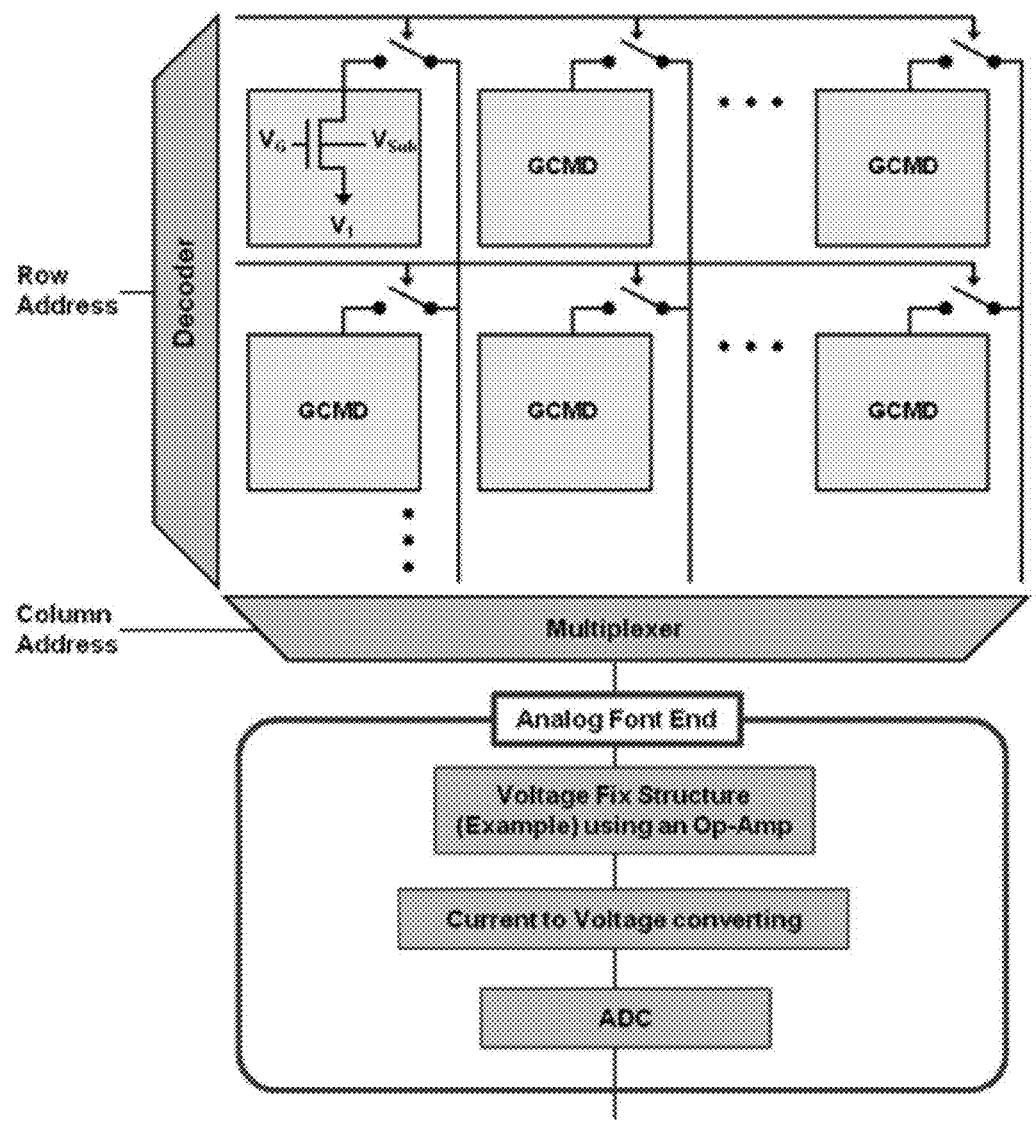
FIG. 10 illustrates an exemplary image sensor device in accordance with some embodiments.

FIG. 10 illustrates an exemplary image sensor device in accordance with some embodiments.

In accordance with some embodiments, the image sensor device includes an array of sensors. A respective sensor in the array of sensors includes a sensor circuit (e.g., FIGS. 8A-8H).

In some embodiments, the image sensor device includes a converter circuit (e.g., FIGS. 9A-9C).

In some embodiments, the array of sensors includes multiple rows of sensors (e.g., at least two rows of sensors are illustrated in FIG. 10). For sensors in a respective row, gate terminals of selection transistors are electrically coupled to a common selection line. For example, as shown in FIG. 10, gate terminals of sensor circuits in a top row are electrically coupled to a same signal line.

In some embodiments, the array of sensors includes multiple columns of sensors (e.g., at least three columns of sensors are illustrated in FIG. 10). For sensors in a respective column, one of source terminals or drain terminals of selection transistors (i.e., either the source terminals of the selection transistors or the drain terminals of the selection transistors) are electrically coupled to a common column line. For example, as shown in FIG. 10, the drain terminals of the selection transistors in a left column of sensors are electrically coupled to a same column line.

FIGS. 11A-11E illustrates an exemplary method for making a semiconductor optical sensor device in accordance with some embodiments.

Figure 11A:
FIGS. 11A-11E illustrate an exemplary method for making a semiconductor optical sensor device in accordance with some embodiments.

FIG. 11A illustrates forming the semiconductor optical sensor device includes forming a third semiconductor region 108 on a silicon substrate 102. In some embodiments, the third semiconductor region 108 is epitaxially grown on the substrate 102.

Figure 11B:

FIG. 11B illustrates forming a first semiconductor region 104, above the silicon substrate 102, doped with a dopant of a first type.

In some embodiments, the first semiconductor region 104 is formed by epitaxially growing the first semiconductor region 104.

In some embodiments, the first semiconductor region 104 is doped in-situ with the dopant of the first type (e.g., n-type) while the first semiconductor region 104 is grown.

In some embodiments, the first semiconductor region 104 is doped with the dopant of the first type (e.g., n-type) using an ion implantation process or a gas phase diffusion process. In some embodiments, the first semiconductor region 104 is doped with the dopant of the first type (e.g., n-type) using an ion implantation process. In some embodiments, the first semiconductor region 104 is doped with the dopant of the first type (e.g., n-type) using a gas phase diffusion process.

Figure 11C:
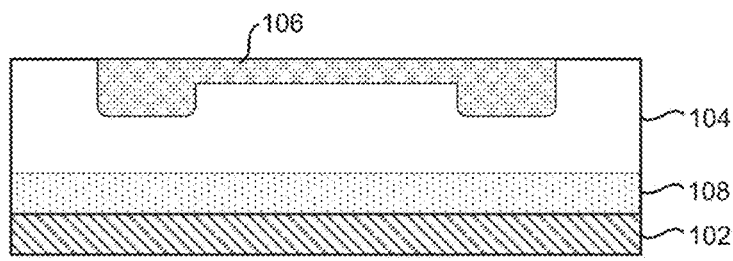

FIG. 11C illustrates forming a second semiconductor region 106, above the silicon substrate 102, doped with a dopant of a second type. The second semiconductor region 106 is positioned above the first semiconductor region 104. The first type (e.g., n-type) is distinct from the second type (e.g., p-type).

In some embodiments, the second semiconductor region 106 is formed by epitaxially growing the second semiconductor region 106.

In some embodiments, the second semiconductor region 106 is doped in-situ with the dopant of the second type (e.g., p-type, and in particular, p+) while the second semiconductor region 106 is grown.

In some embodiments, the second semiconductor region 106 is doped with the dopant of the second type (e.g., p-type, and in particular, p+) using an ion implantation process or a gas phase diffusion process. In some embodiments, the second semiconductor region 106 is doped with the dopant of the second type (e.g., p-type, and in particular, p+) using an ion implantation process. In some embodiments, the second semiconductor region 106 is doped with the dopant of the second type (e.g., p-type, and in particular, p+) using a gas phase diffusion process.

In some embodiments, the second semiconductor region 106 is doped with the dopant of the second type (e.g., p-type, and in particular, p+) using an ion implantation process after the first semiconductor region 104 is doped with the dopant of the first type using an ion implantation process or a gas phase diffusion process. In some embodiments, the second semiconductor region 106 is doped with the dopant of the second type (e.g., p-type, and in particular, p+) using an ion implantation process after the first semiconductor region 104 is doped with the dopant of the first type using an ion implantation process. In some embodiments, the second semiconductor region 106 is doped with the dopant of the second type (e.g., p-type, and in particular, p+) using an ion implantation process after the first semiconductor region 104 is doped with the dopant of the first type using a gas phase diffusion process.

Figure 11D:
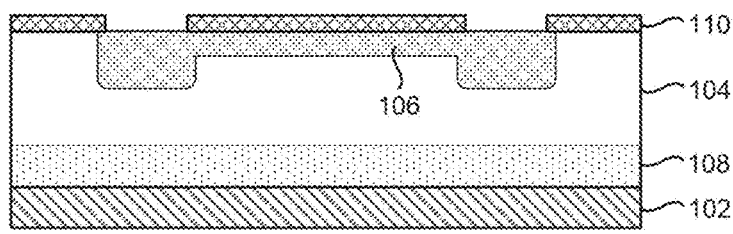

FIG. 11D illustrates forming a gate insulation layer 110 above the second semiconductor region 106. One or more portions of the second semiconductor region 106 are exposed from the gate insulation layer 110 to define a source and a drain. For example, the gate insulation layer 110 is pattern etched (e.g., using a mask) to expose the source and the drain.

As described with respect to FIGS. 1A and 1B, the second semiconductor region 106 has a top surface that faces the gate insulation layer 110. The second semiconductor region 106 has a bottom surface that is opposite to the top surface of the second semiconductor region 106. The second semiconductor region 106 has an upper portion that includes the top surface of the second semiconductor region 106. The second semiconductor region 106 has a lower portion that includes the bottom surface of the second semiconductor region 106 and is mutually exclusive with the upper portion. The first semiconductor region 104 is in contact with both the upper portion and the lower portion of the second semiconductor region 106. The first semiconductor region 104 is in contact with the upper portion of the second semiconductor region 106 at least at a location positioned under the gate 112.

Figure 11E:
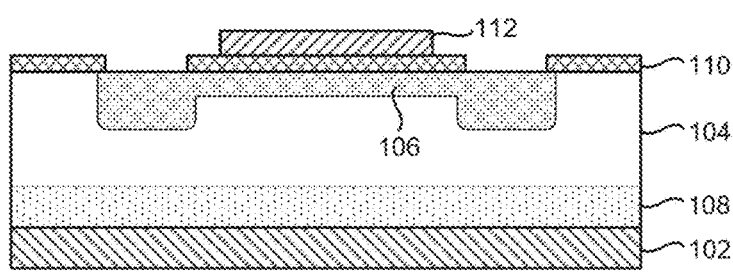

FIG. 11E illustrates forming a gate 112 positioned above the gate insulation layer 110.

In some embodiments, a method of forming a sensor array includes concurrently forming a plurality of devices on a common silicon substrate. For example, third semiconductor regions of multiple devices may be formed concurrently in a single epitaxial growth process. Subsequently, first semiconductor regions of the multiple devices may be formed concurrently in a single epitaxial growth process. Thereafter, second semiconductor regions of the multiple devices may be formed concurrently in a single ion implantation process. Similarly, gate insulation layers of the multiple devices may be formed concurrently, and gates of the multiple devices may be formed concurrently.

In accordance with some embodiments, a method for sensing light includes exposing a photo-sensing element (e.g., GCMD in FIG. 6) to the light.

The method also includes providing a fixed voltage to the source terminal of the photo-sensing element (e.g., by applying a fixed voltage $V_1$ and applying $V_R$ to the selection transistor 604 (FIG. 6). Based on an intensity of light on the GCMD, a drain current of the GCMD changes.

In some embodiments, the method includes determining an intensity of the light based on the drain current of the photo-sensing element (e.g., GCMD). A change in the drain current indicates whether light is detected by the photo-sensing element.

In some embodiments, measuring the drain current includes converting the drain current to a voltage signal (e.g., converting the drain current $I_{GCMD}$ to $V_{tamp}$, FIG. 9A).

In some embodiments, converting the drain current to the voltage signal includes using a transimpedance amplifier (e.g., transimpedance amplifier 904, FIG. 9A) to convert the drain current to the voltage signal.

In some embodiments, measuring the drain current includes using any converter circuit described herein (e.g., FIGS. 9A-9C).

In some embodiments, the method includes activating the selection transistor of the sensor circuit (e.g., the selection transistor 604, FIG. 6). Activating the selection transistor allows a drain current to flow through the selection transistor, thereby allowing a measurement of the drain current.

In some embodiments, the fixed voltage is provided to the source terminal of the photo-sensing element prior to exposing the photo-sensing element to light. For example, in FIG. 6, the selection transistor 604 is activated before exposing the photo-sensing element 602 to light.

In some embodiments, the fixed voltage is provided to the source terminal of the photo-sensing element subsequent to exposing the photo-sensing element to light. For example, in FIG. 6, the selection transistor 604 is activated after exposing the photo-sensing element 602 to light.

In accordance with some embodiments, a method for detecting an optical image includes exposing any array of sensors described herein (e.g., FIG. 10) to a pattern of light.

The method also includes, for a photo-sensing element of a respective sensor in the array of sensors, providing a respective voltage to the source terminal of the photo-sensing element of the respective image sensor. For example, a selection transistor (e.g., the selection transistor 604, FIG. 6) of the respective sensor is activated to provide the respective voltage, thereby allowing a measurement of a drain current of the respective sensor.

The method further includes measuring a drain current of the photo-sensing element (e.g., the photo-sensing element 602).

In some embodiments, the source terminals of the photo-sensing elements in the array of sensors concurrently receive respective voltages. For example, respective voltages are concurrently applied to multiple photo-sensing elements (e.g., photo-sensing elements in a same row) for a concurrent reading of the multiple photo-sensing elements.

In some embodiments, the source terminals of the photo-sensing elements in the array of sensors sequentially receive respective voltages. For example, respective voltages are sequentially applied to multiple photo-sensing elements (e.g., photo-sensing elements in a same column) for sequential reading of the multiple photo-sensing elements.

In some embodiments, the source terminals of photo-sensing elements in the array of sensors receive a same voltage.

In some embodiments, the drain currents of the photo-sensing elements in the array of sensors are measured in batches. For example, the drain currents of photo-sensing elements in a same row are measured in a batch (e.g., as a set).

In some embodiments, the drain currents of the photo-sensing elements in the array of sensors are concurrently measured. For example, the drain currents of the photo-sensing elements in a same row are concurrently measured.

In some embodiments, the drain currents of the photo-sensing elements in the array of sensors are sequentially measured. For example, the drain currents of the photo-sensing elements in a same column are concurrently measured.

FIGS. 12A-12E illustrate spectrometers in accordance with some embodiments.

In FIGS. 12A-12E, spectrometers include input aperture 1106 for receiving light that includes a visible wavelength component (e.g., light having a visible wavelength, such as 600 nm) and shortwave infrared wavelength component (e.g., light having a shortwave infrared wavelength, such as 1500 nm). In some embodiments, the light received by input aperture 1106 has a continuous spectrum ranging from a visible wavelength to a shortwave infrared wavelength (e.g., light from 600 nm to 1500 nm). In some embodiments, the light received by input aperture 1106 has discrete peaks in one or more visible wavelengths and/or one or more shortwave infrared wavelengths. In some embodiments, input aperture 1106 includes a substrate with a first portion of the substrate coated to block transmission of the light received on the input aperture and a second portion, distinct from the first portion, of the substrate configured to allow transmission of at least a portion of the light received on the input aperture (e.g., the second portion does not overlap with the first portion). In some embodiments, input aperture 1106 includes a glass substrate. In some embodiments, input aperture 1106 includes a sapphire substrate. In some embodiments, input aperture 1106 includes a plastic substrate (e.g., polycarbonate substrate) that is optically transparent to visible and shortwave infrared light. In some embodiments, the coating is located on a surface, of the substrate, facing the incoming light (e.g., light from a sample or a target object). In some embodiments, the coating is located on a surface, of the substrate, facing away from the incoming light. In some embodiments, input aperture 1106 is a linear aperture (e.g., an entrance slit). Input aperture 1106 is configured to transmit both the visible wavelength component and the shortwave infrared wavelength component. For example, input aperture 1106 is transparent to both the visible wavelength component and the shortwave infrared wavelength component (e.g., input aperture 1106 has a transmittance of at least 60% in the visible and shortwave infrared wavelength range). In some embodiments, input aperture 1106 is configured to reduce transmission of light in a particular wavelength range (e.g., input aperture 1106 is configured to reduce transmission of ultraviolet light).

The spectrometers also include first set 1107 of one or more lenses configured to relay light from the input aperture. In some embodiments, first set 1107 of one or more lenses is configured to collimate the light from the input aperture. In some embodiments, first set 1107 of one or more lenses includes a doublet that is configured to reduce one or more aberrations (e.g., chromatic aberration) in visible and shortwave infrared wavelengths. In some embodiments, first set 1107 of one or more lenses includes a triplet or any other combination of multiple lenses (e.g., multiple lenses cemented together or multiple separate lenses). First set 1107 of one or more lenses is configured to transmit both the visible wavelength components and the shortwave infrared wavelength component.

The spectrometers further include one or more dispersive optical elements, such as dispersive optical element 1108 (e.g., a prism), configured to disperse light from first set 1107 of one or more lenses. The light from first set 1107 of one or more lenses includes the visible wavelength component and the shortwave infrared wavelength component. In some embodiments, the one or more dispersive optical elements include one or more transmission dispersive optical elements (e.g., a volume holographic transmission grating). The one or more dispersive optical elements are configured to transmit both the visible wavelength components and the shortwave infrared wavelength component.

In some embodiments, the one or more dispersive optical elements include one or more prisms. Diffraction gratings are configured to disperse light multiple orders, and light of a particular wavelength is dispersed into multiple directions. Thus, two different wavelength components can be dispersed into a same direction (e.g., a second order diffraction of 500 nm light and a first order diffraction of 1000 nm light overlap; and similarly, a third order diffraction of 500 nm light, a second order diffraction of 750 nm light, and a first order diffraction of 1500 nm light overlap). This limits a wavelength range that can be concurrently analyzed by the spectrometer. Prisms do not disperse light of a particular wavelength into multiple directions. Thus, the use of a prism can significantly increase the wavelength range of light that can be concurrently analyzed. In some embodiments, the one or more prisms include one or more equilateral prisms.

The spectrometers include second set 1109 of one or more lenses configured to focus the dispersed light. In some embodiments, second set 1109 of one or more lenses includes a doublet that is configured to reduce one or more aberrations (e.g., chromatic aberration) in visible and shortwave infrared wavelengths. In some embodiments, second set 1109 of one or more lenses includes a triplet or any other combination of multiple lenses (e.g., multiple lenses cemented together or multiple separate lenses). Second set 1109 of one or more lenses is configured to transmit both the visible wavelength components and the shortwave infrared wavelength component. In some embodiments, the light focused by second set 1109 of one or more lenses includes light of a wavelength range from 600 nm to 1500 nm.

The spectrometers include array detector 1112 configured for converting the light from second set 1109 of one or more lenses to electrical signals (e.g., a two-dimensional array of gate-controlled charge modulation devices described herein, such as the image sensor device illustrated in FIG. 10). The electrical signals include electrical signals indicating intensity of the visible wavelength component and electrical signals indicating intensity of the shortwave infrared wavelength component.

In some embodiments, array detector 1112 includes a contiguous detector array that is capable of converting the visible wavelength component and the shortwave infrared wavelength component to electrical signals (e.g., a single detector array generates both electrical signals indicating the intensity of the visible wavelength component and electrical signals indicating the intensity of the shortwave infrared wavelength component).

In some embodiments, the contiguous detector array has a quantum efficiency of at least 20% for light of 1500 nm wavelength. In some embodiments, the contiguous detector array has a quantum efficiency of at least 20% for light of 600 nm wavelength. In some embodiments, the contiguous detector array is a germanium detector array.

In some embodiments, the contiguous detector array includes a two-dimensional array of devices for sensing light (e.g., 100×100 array of devices for sensing light). In some embodiments, each device of the two-dimensional array of devices is a charge modulation device. In some embodiments, each device of the two-dimensional array of devices is a charge modulation device. In some embodiments, the contiguous detector array includes a one-dimensional array of devices for sensing light (e.g., 100×1 array of devices for sensing light).

In some embodiments, array detector 1112 is a two-dimensional array of devices for sensing light. In such embodiments, the spectrometer can be used for hyperspectral imaging.

In FIGS. 12A-12E, array detector 1112 is positioned parallel to a plane defined by optical paths from input aperture 1106 to second set 1109 of one or more lenses (e.g., a plane that encompasses an optical path from input aperture 1106 to first set 1107 of one or more lenses, an optical path from first set 1107 of one or more lenses to dispersive optical element 1108, an optical path from dispersive optical element 1108 to second set 1109 of one or more lenses). In some embodiments, array detector 1112 is substantially parallel to any of the optical paths from input aperture 1106 to second set 1109 of one or more lenses (e.g., an angle defined by a surface normal of array detector 1112 and a respective optical path is more than, for example, 45 degrees, 60 degrees, or 75 degrees). For example, in some cases, array detector 1112 is laid down flat on a bottom of the spectrometer. This further reduces a size of the spectrometer.

The spectrometers optionally include detection window 1101, one or more light sources (e.g., visible light source 1102 and/or infrared light source 1103) for illuminating a sample, and/or third set 1104 of one or more lenses for focusing light from an object (or a sample) onto the input aperture. For example, third set 1104 of one or more lenses focus diffuse reflection from the object onto the input aperture. Detection window 1101 and third set 1104 of one or more lenses are configured to transmit both the visible wavelength components and the shortwave infrared wavelength component. In some embodiments, the one or more light sources include a broadband light source configured to concurrently emit light that corresponds to the visible wavelength component and light that corresponds to the shortwave infrared wavelength component. In some embodiments, the one or more light sources include one or more visible light sources (e.g., visible light source 1102) configured to emit light that corresponds to the visible wavelength component and one or more shortwave infrared light sources (e.g., shortwave infrared light source 1103) configured to emit light that corresponds to the shortwave infrared wavelength component.

Figure 12A:
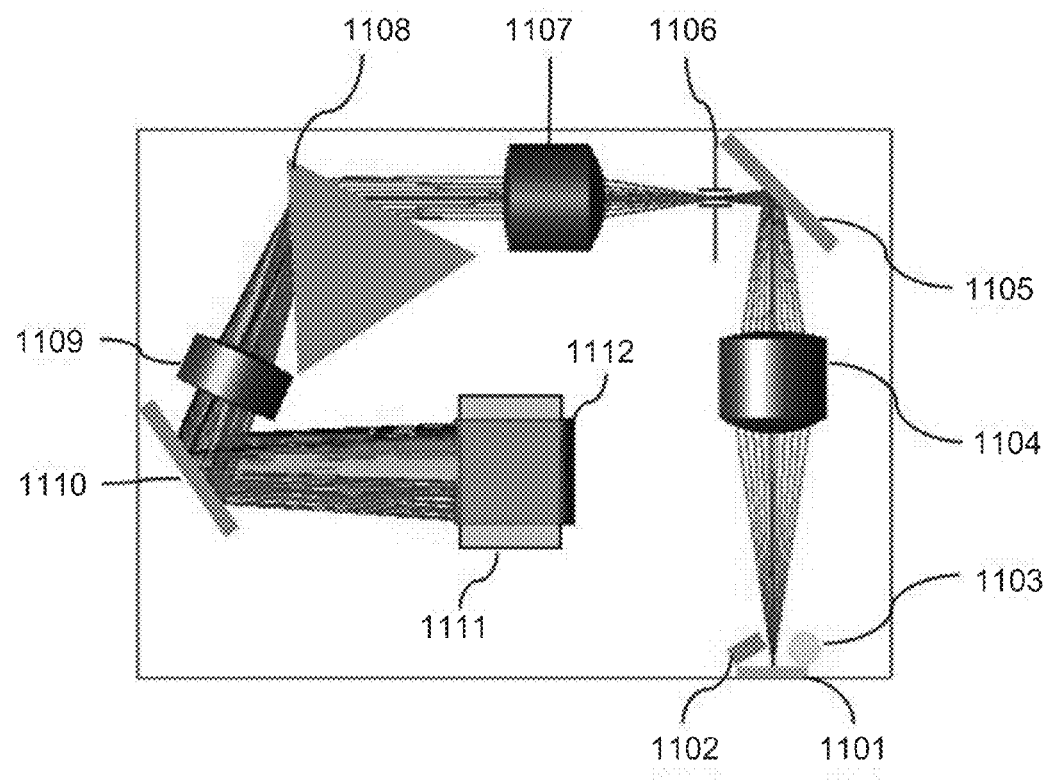
FIGS. 12A-12E illustrate spectrometers in accordance with some embodiments.

In some embodiments, the spectrometers include one or more mirrors for directing light. In FIG. 12A, the spectrometer includes mirror 1110 configured to reflect the light from second set 1109 of one or more lenses toward array detector 1112. In some embodiments, an optical axis of light from mirror 1110 is substantially parallel (e.g., an angle formed by the optical axis of light from mirror 1110 and the optical axis between first set 1107 of one or more lenses and the one or more dispersive optical elements is 30 degrees or less) to an optical axis between first set 1107 of one or more lenses and the one or more dispersive optical elements (e.g., dispersive optical element 1108). In FIG. 12A, the spectrometer includes mirror 1110 and mirror 1111 between second set 1109 of one or more lenses and array detector 1112. Mirror 1110 is configured to relay light from second set 1109 of one or more lenses to mirror 1111. In some embodiments, mirror 1111 is configured to reflect the light from mirror 1110 by 90 degrees toward array detector 1112.

In FIG. 12A, the spectrometer also includes mirror 1105 for relaying light from third set 1104 of one or more lenses toward input aperture 1106.

The size of the entire spectrometer illustrated in FIG. 12A, including detector array 1112, is 4.3 cm in length by 3.3 cm in width by 0.7 cm in height, or smaller.

Figure 12B:
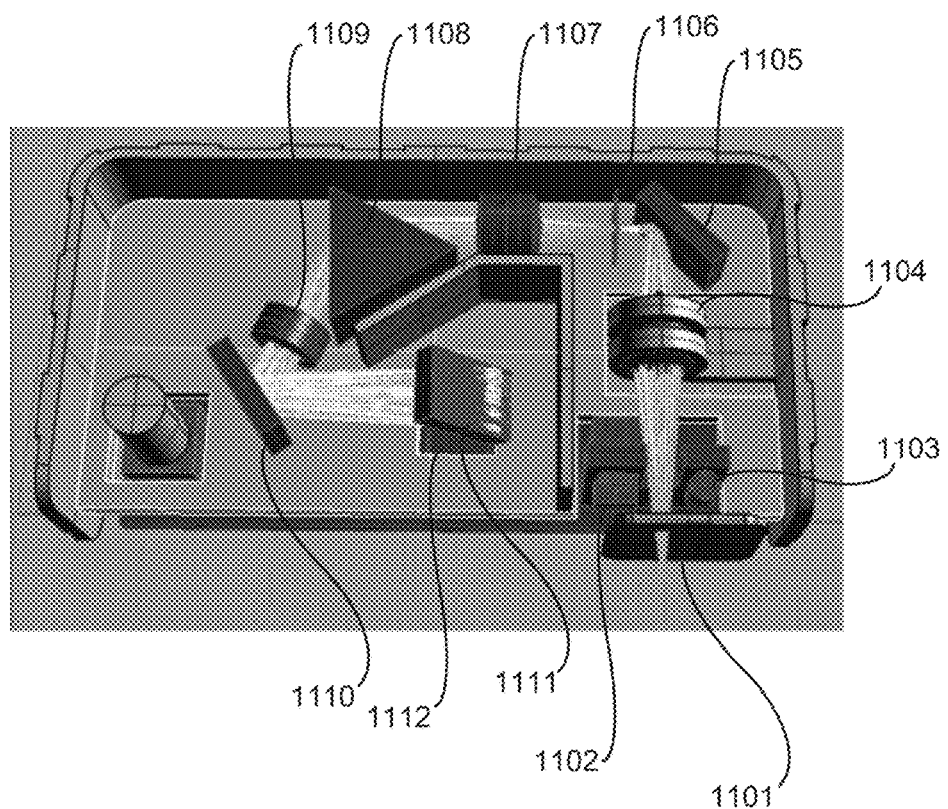

FIG. 12B is a schematic diagram, in a perspective view, of the spectrometer shown in FIG. 12A.

In FIG. 12B, additional components not shown in FIG. 12A are also depicted. For example, one or more baffles located adjacent to visible light source 1102 and infrared light source 1103.

Figure 12C:
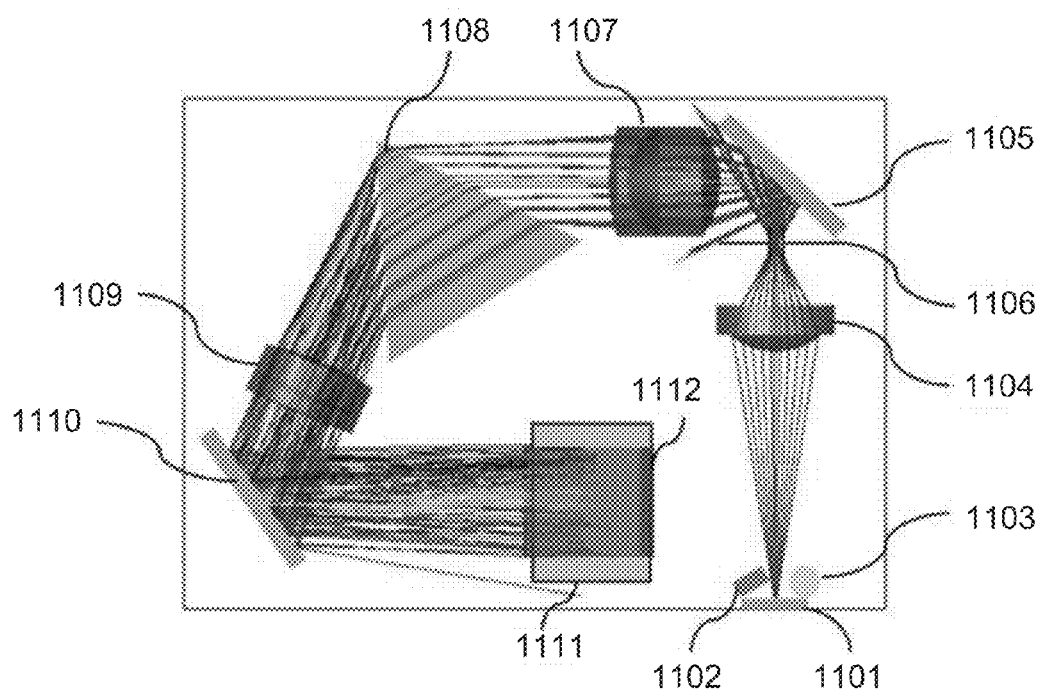

The spectrometer illustrated in FIG. 12C is similar to the spectrometer illustrated in FIG. 12A, except that input aperture 1106 is positioned between third set 1104 of one or more lenses and mirror 1105. Thus, mirror 1105 is configured to reflect the light from input aperture 106 toward first set 107 of one or more lenses.

Figure 12D:
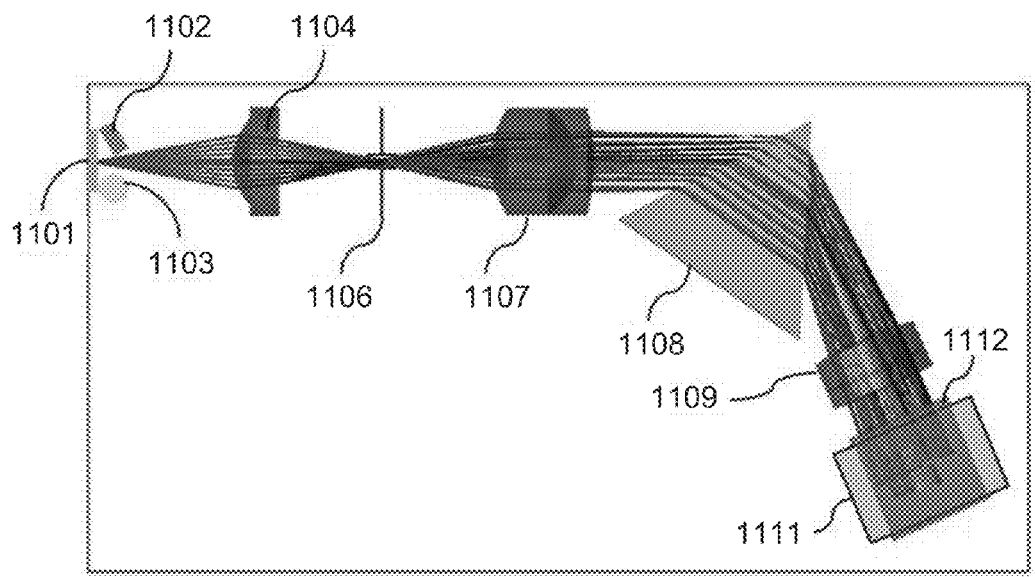

The spectrometer illustrated in FIG. 12D is similar to the spectrometers illustrated in FIGS. 12A and 12C except that mirrors 1105 and 1110 are not used. Instead, input aperture 1106 and first set 1107 of one or more lenses are linearly positioned (e.g., an optical axis of first set 1107 of one or more lenses is aligned with input aperture 1106).

Figure 12E:
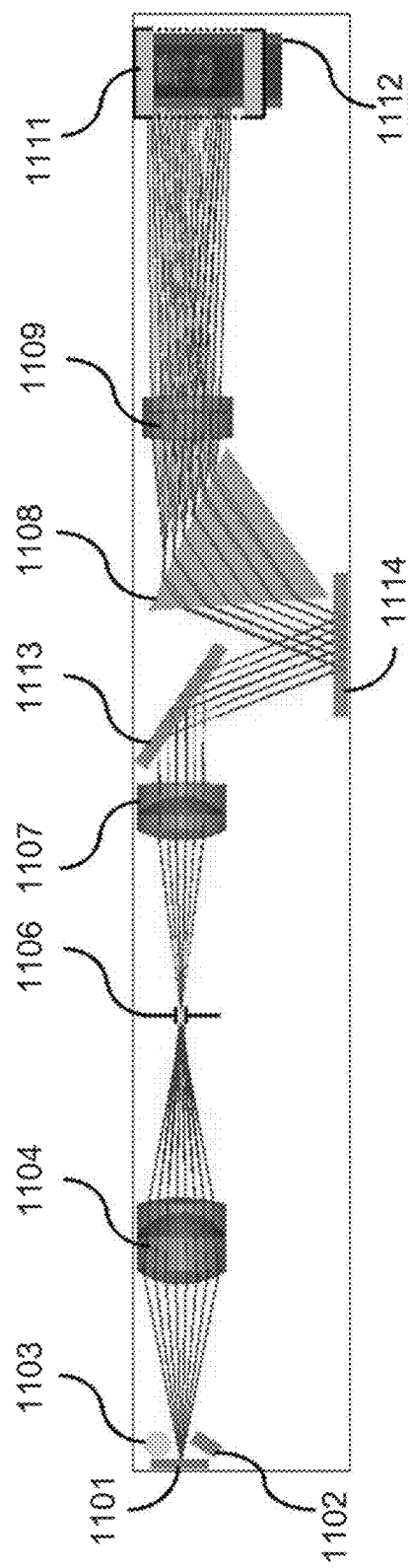

In some embodiments, the spectrometer includes one or more mirrors configured to reflect the light from the first set of one or more lenses toward the one or more dispersive optical elements so that the dispersed light from the one or more dispersive optical elements is substantially parallel to the light from the first set of one or more lenses (e.g., the light from the first set of one or more lenses and the dispersed light from the one or more dispersive optical elements form an angle that is less than 30 degrees, 20 degrees, 15 degrees, 10 degrees, or 5 degrees). In some embodiments, the spectrometer includes at least two mirrors configured to reflect the light from the first set of one or more lenses toward the one or more dispersive optical elements so that the dispersed light from the one or more dispersive optical elements is substantially parallel to the light from the first set of one or more lenses. For example, the spectrometer illustrated in FIG. 12E is similar to the spectrometers illustrated in FIG. 12D except that the spectrometer illustrated in FIG. 12E includes mirrors 1113 and 1114 configured to reflect the light from first set 1107 of one or more lenses toward one or more dispersive optical elements 1108 so that the dispersed light from one or more dispersive optical elements 1108 is substantially parallel to the light from first set 1107 of one or more lenses. The configuration shown in FIG. 12E allows a compact spectrometer. For example, the size of the spectrometer shown in FIG. 12E is 10 cm in length by 1.5 cm in width by 0.7 cm in height, or smaller.

In some embodiments, the spectrometer includes one or more mirrors configured to reflect the light from the first set of one or more lenses toward the one or more dispersive optical elements so that the light from the second set of one or more lenses is substantially parallel to the light from the first set of one or more lenses (e.g., an optical axis of the first set of one or more lenses and an optical axis of the second set of one or more lenses form an angle that is less than 30 degrees, 20 degrees, 15 degrees, 10 degrees, or 5 degrees). In some embodiments, the spectrometer includes at least two mirrors configured to reflect the light from the first set of one or more lenses toward the one or more dispersive optical elements so that the light from the second set of one or more lenses is substantially parallel to the light from the first set of one or more lenses. For example, the spectrometer illustrated in FIG. 12E includes mirrors 1113 and 1114 that reflect the light from first set 1107 of one or more lenses toward one or more dispersive optical elements 1108 so that the dispersed light from one or more dispersive optical elements 1108 is substantially parallel to the light from first set 1107 of one or more lenses.

In accordance with some embodiments, a method for concurrently analyzing visible and shortwave infrared light includes receiving light that includes a visible wavelength component and a shortwave infrared wavelength component with any embodiment of the apparatus described above so that at least a portion of the visible wavelength component and at least a portion of the shortwave infrared wavelength component concurrently impinge on the array detector of the apparatus; and processing the electrical signals from the array detector to obtain the intensity of the visible wavelength component and the intensity of the shortwave infrared wavelength component.

Figure 13:
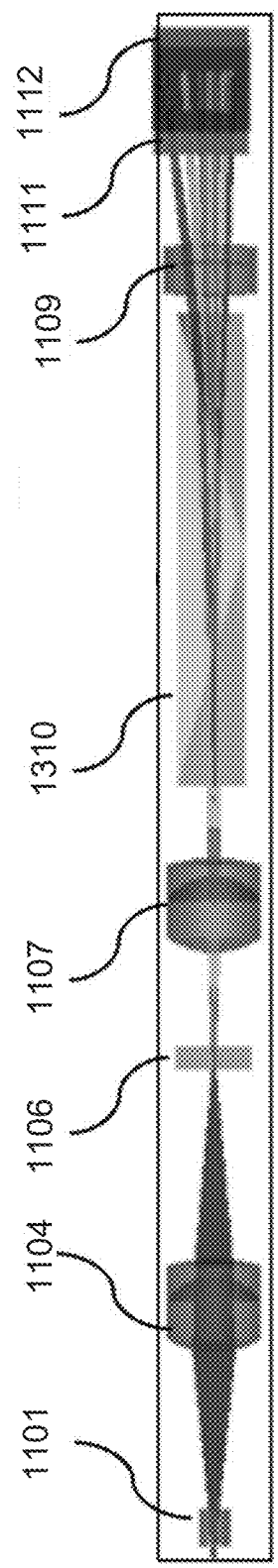
FIG. 13 illustrates a spectrometer in accordance with some embodiments.

FIG. 13 illustrates a spectrometer in accordance with some embodiments.

The spectrometer shown in FIG. 13 is similar to the spectrometer shown in FIG. 12E except that prism assembly 1310 is used in place of a combination of mirrors 1113 and 1114 and dispersive optical element 1108. Inventors of this application have discovered that a rotation of one or more mirrors (e.g., mirror 1113 or 1114) contributes to misalignment of the spectrometer. The inventors of this application reduced misalignment of the spectrometer caused by the rotation of one or more mirrors 1113 and 1114 (relative to dispersive optical element 1108) by replacing the combination of mirrors 1113 and 1114 and dispersive optical element 1108 with prism assembly 1310, which is described further with respect to FIG. 16. In addition, the spectrometer shown in FIG. 13 is more compact (e.g., narrower) than the spectrometer shown in FIG. 12E, which improves portability of the spectrometer.

Thus, the spectrometer (e.g., an apparatus for analyzing light) shown in FIG. 13 includes input aperture 1106 for receiving light; first set 1107 of one or more lenses configured to relay light from the input aperture; and prism assembly 1310 configured to disperse light from the first set of one or more lenses. The prism assembly includes a plurality of prisms that includes a first prism, a second prism that is distinct from the first prism, and a third prism that is distinct from the first prism and the second prism (e.g., prism assembly 1310 shown in FIG. 14A with three prisms or the prism assembly shown in FIG. 15A with five prisms). The first prism is mechanically coupled with the second prism and the second prism is mechanically coupled with the third prism. The spectrometer also includes second set 1109 of one or more lenses configured to focus the dispersed light from the prism assembly; and array detector 1112 configured for converting the light from the second set of one or more lenses to electrical signals.

In some embodiments, the spectrometer shown in FIG. 13 has one or more characteristics and features of the spectrometers described with respect to FIGS. 12A-12E. For brevity, such details are not repeated herein.

In some embodiments, prism assembly 1310 and second set 1109 of one or more lenses are positioned so that the light from prism assembly 1310 passes through second set 1109 of one or more lenses without being reflected by any mirror (e.g., FIG. 13).

In some embodiments, second set 1109 of one or more lenses and the array detector are positioned so that the light from second set 1109 of one or more lenses is directed to array detector 1112 without being reflected by any mirror.

In some embodiments, second set 1109 of one or more lenses and the array detector are positioned so that the light from second set 1109 of one or more lenses is directed to array detector 1112 after being reflected by only one mirror (e.g., mirror 1111 in FIG. 13).

Figure 14A:
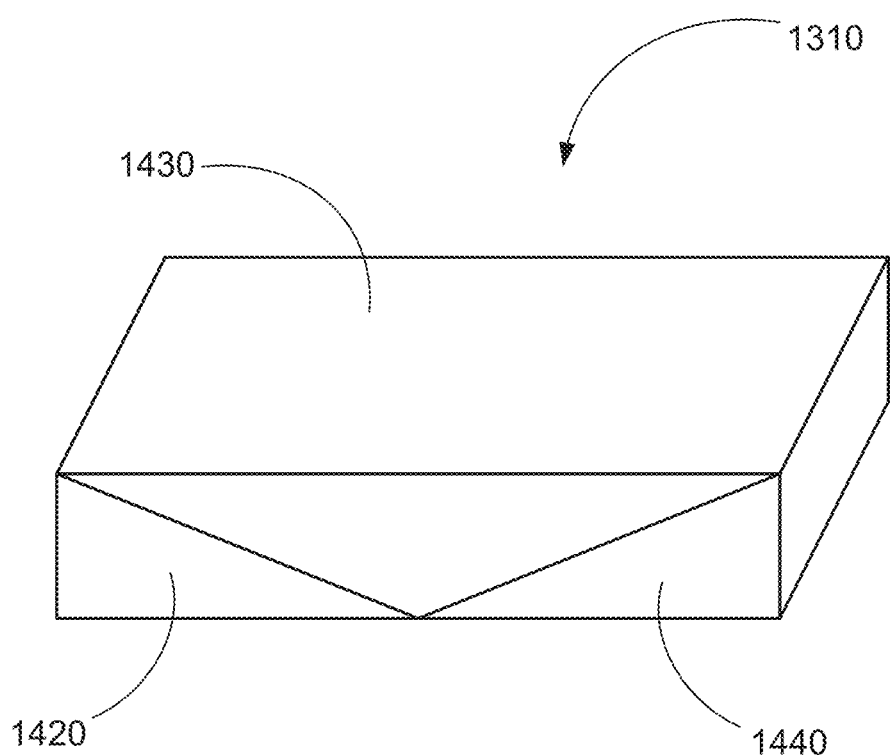
FIGS. 14A-14C illustrate a prism assembly and its components in accordance with some embodiments.
Figure 14B:
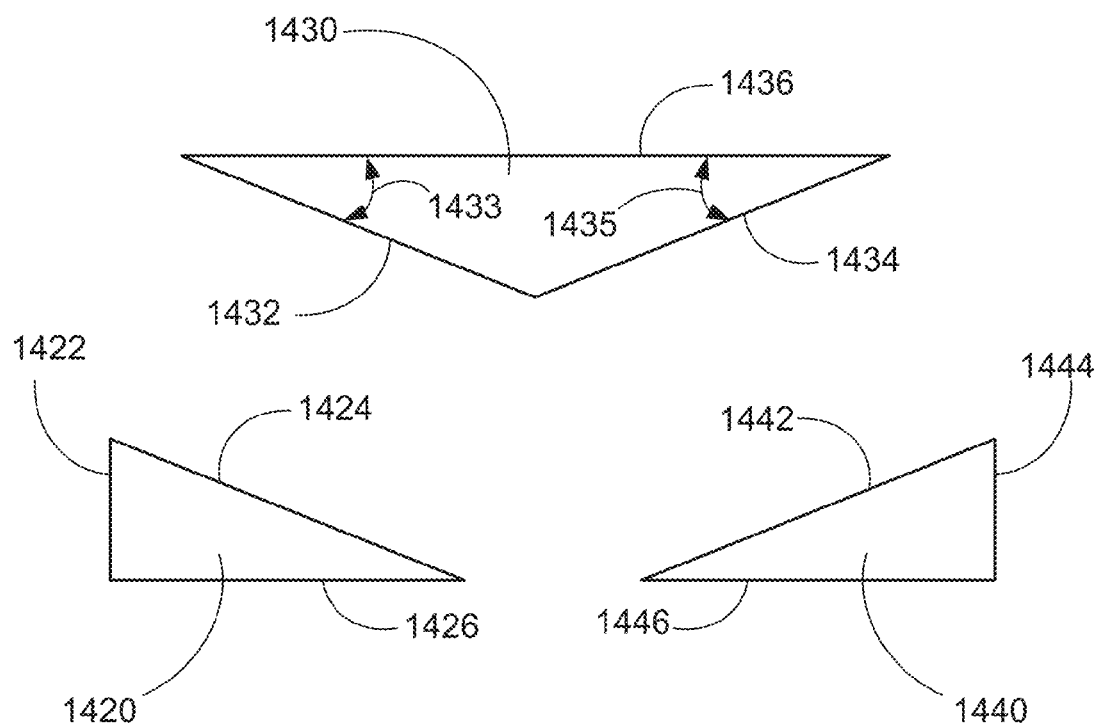
Figure 14C:
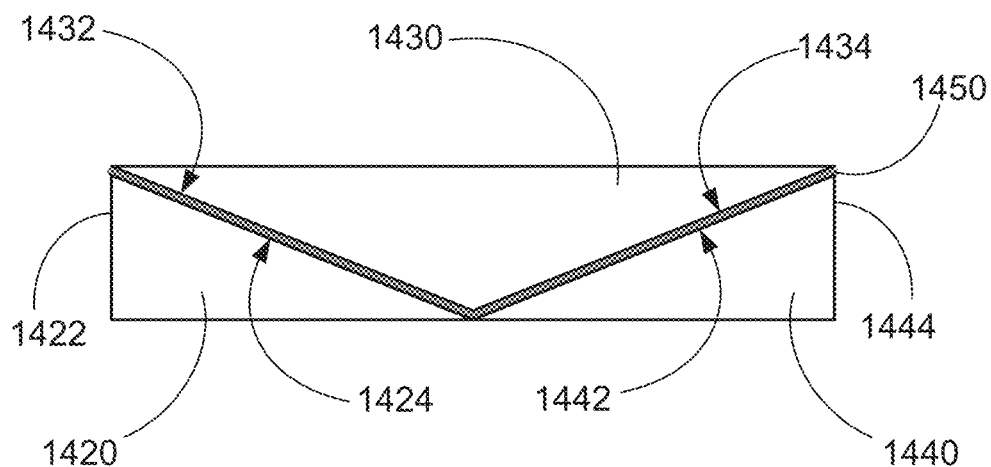

FIGS. 14A-14C illustrate prism assembly 1310 and its components in accordance with some embodiments.

Prism assembly 1310 shown in FIG. 14A includes three prisms: first prism 1420, second prism 1430, and third prism 1440. In some embodiments, first prism 1420 is mechanically coupled to second prism 1430 and second prism 1430 is mechanically coupled to third prism 1440 (e.g., using adhesives). This reduces or eliminates rotation of first prism 1420 relative to second prism 1430 and third prism 1440, and reduces or eliminates rotation of second prism 1430 relative to third prism 1440. In addition, the rotation of the entrance surface of prism assembly 1310 is compensated by the rotation of the exit surface of prism assembly 1310. For example, any variation in the direction of refracted light caused by the rotation of the entrance surface of prism assembly 1310 is reduced by the rotation of the exit surface of prism assembly 1310. Thus, misalignment in the spectrometer is reduced by using prism assembly 1310.

In some embodiments, first prism 1420 is a right triangular prism, second prism 1430 is a triangular prism, and third prism 1440 is a right triangular prism.

In some embodiments, first prism 1420 is optically coupled with second prism 1430 and second prism 1430 is optically coupled with third prism 1440. For example, light transmitted from first prism 1420 enters second prism 1430, and light transmitted from second prism 1430 enters third prism 1440.

FIG. 14B is an exploded side view of prism assembly 1310 shown in FIG. 14A. First prism 1420 has first optical surface 1422 and second optical surface 1424. In some embodiments, first prism 1420 has third surface 1426. In some embodiments, third surface 1426 is an optical surface (e.g., a third optical surface). For example, third surface 1426 satisfies optical flatness and surface roughness requirements (e.g., $\lambda/20$ flatness and 20-10 scratch-dig). In some embodiments, third surface 1426 is a non-optical surface (e.g., third surface 1426 does not satisfy optical flatness or surface roughness requirements). Second prism 1430 has first optical surface 1432 and second optical surface 1434. In some embodiments, second prism 1430 has third surface 1436. In some embodiments, third surface 1436 is an optical surface (e.g., a third optical surface). In some embodiments, third surface 1436 is a non-optical surface. Third prism 1440 has first optical surface 1442 and second optical surface 1444. In some embodiments, third prism 1440 has third surface 1446. In some embodiments, third surface 1446 is an optical surface (e.g., a third optical surface). In some embodiments, third surface 1446 is a non-optical surface. For second prism 1430, first optical surface 1432 and third surface 1436 define first angle 1433 and second optical surface 1434 and third surface 1436 define second angle 1435.

In some embodiments, first angle 1433 is between 10° and 30°. In some embodiments, first angle 1433 is between 15° and 25°. In some embodiments, first angle 1433 is between 18° and 22°. In some embodiments, first angle 1433 is between 10° and 20°. In some embodiments, first angle 1433 is between 13° and 17°.

In some embodiments, second angle 1435 is between 10° and 30°. In some embodiments, second angle 1435 is between 15° and 25°. In some embodiments, second angle 1435 is between 18° and 22°. In some embodiments, second angle 1435 is between 10° and 20°. In some embodiments, second angle 1435 is between 13° and 17°.

In some embodiments, first angle 1433 and second angle 1435 are identical. In some embodiments, first angle 1433 is distinct from second angle 1435.

First prism 1420 has first optical surface 1422 and second optical surface 1424 that is distinct from, and non-parallel to, first optical surface 1422. Second prism 1430 has first optical surface 1432 and second optical surface 1434 that is distinct from, and non-parallel to, first optical surface 1432. Third prism 1440 has first optical surface 1442 and second optical surface 1444 that is distinct from, and non-parallel to, first optical surface 1442. In some embodiments, second optical surface 1424 of first prism 1420 is optically coupled with first optical surface 1432 of second prism 1430 (e.g., light transmitted from second optical surface 1424 of first prism 1420 enters through first optical surface 1432 of second prism 1430). Second optical surface 1434 of second prism 1430 is optically coupled with first optical surface 1442 of third prism 1440 (e.g., light transmitted from second optical surface 1434 of second prism 1430 enters through first optical surface 1442 of third prism 1440).

In some embodiments, second optical surface 1424 of first prism 1420 is substantially parallel (e.g., having an angle of 20° or less, 15° or less, or 10° or less) to first optical surface 1432 of second prism 1430. In some embodiments, second optical surface 1434 of second prism 1430 is substantially parallel (e.g., having an angle of 20° or less, 15° or less, or 10° or less) to first optical surface 1442 of third prism 1440.

In some embodiments, first prism 1420 has third surface 1426 that is distinct from, and non-parallel to, first optical surface 1422 and second optical surface 1424, and third prism 1440 has third surface 1446 that is distinct from, and non-parallel to, first optical surface 1442 and second optical surface 1444. Third surface 1426 of first prism 1420 is substantially perpendicular (e.g., having an angle between 80° and 100°) to first optical surface 1422 of first prism 1420 (e.g., first prism 1420 is a Littrow prism). Third surface 1446 of third prism 1440 is substantially perpendicular (e.g., having an angle between 80° and 100°) to second optical surface 1444 of third prism 1440 (e.g., third prism 1440 is a Littrow prism).

In some embodiments, second prism 1430 has third surface 1436 that is distinct from, and non-parallel to, first optical surface 1432 of second prism 1430 and second optical surface 1434 of second prism 1430.

In some embodiments, third surface 1436 of second prism 1430 is substantially parallel to third surface 1426 of first prism 1420 and third surface 1446 of third prism 1440.

In some embodiments, first optical surface 1432 of second prism 1430 and third optical surface 1436 of second prism 1430 define a first angle, and second optical surface 1434 of second prism 1430 and third optical surface 1436 of second prism 1430 define a second angle. The second angle corresponds to the first angle (e.g., the second angle and the first angle are the same). For example, second prism 1430 has a cross section that has a shape of an equilateral triangle.

In some embodiments, first optical surface 1422 of first prism 1420 is substantially parallel (e.g., having an angle of 20° or less, 15° or less, or 10° or less) to second optical surface 1444 of third prism 1440. In some embodiments, prism assembly 1310 has a shape of a rectangular prism.

In some embodiments, first prism 1420 and third prism 1440 have a same shape (e.g., both first prism 1420 and third prism 1440 have same dimensions).

In some embodiments, first prism 1420 is a Littrow prism, second prism 1430 is a triangular component prism, and third prism 1440 is a Littrow prism.

In some embodiments, the second prism is an equilateral prism (e.g., an equilateral triangular prism).

Although FIG. 14B illustrates that the prism assembly is made by combining three distinct and separate prisms, in some embodiments, the first prism and the third prism are integrally formed.

FIG. 14C illustrates that first prism 1420 and second prism 1430 are mechanically coupled by adhesive 1450 and second prism 1430 and third prism 1440 are mechanically coupled by adhesive 1450.

Figure 15B:
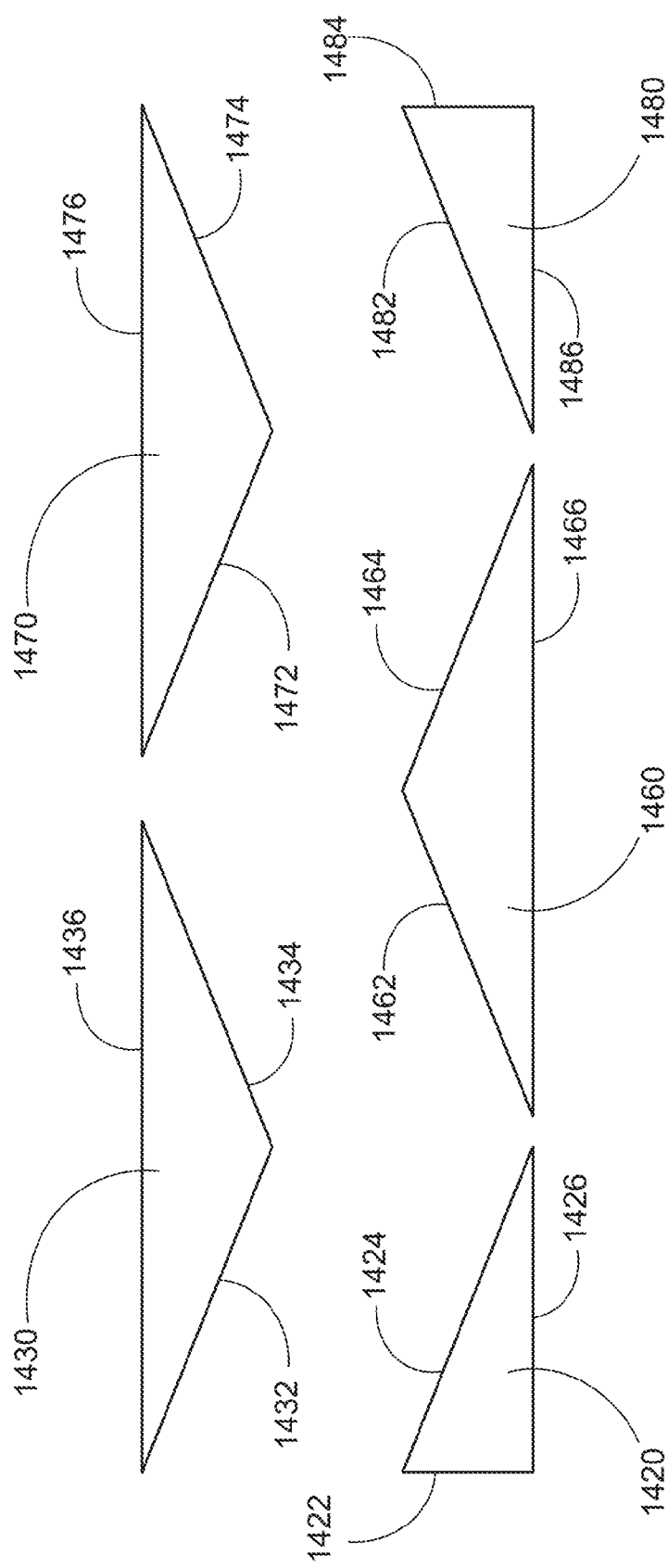
Figure 15C:
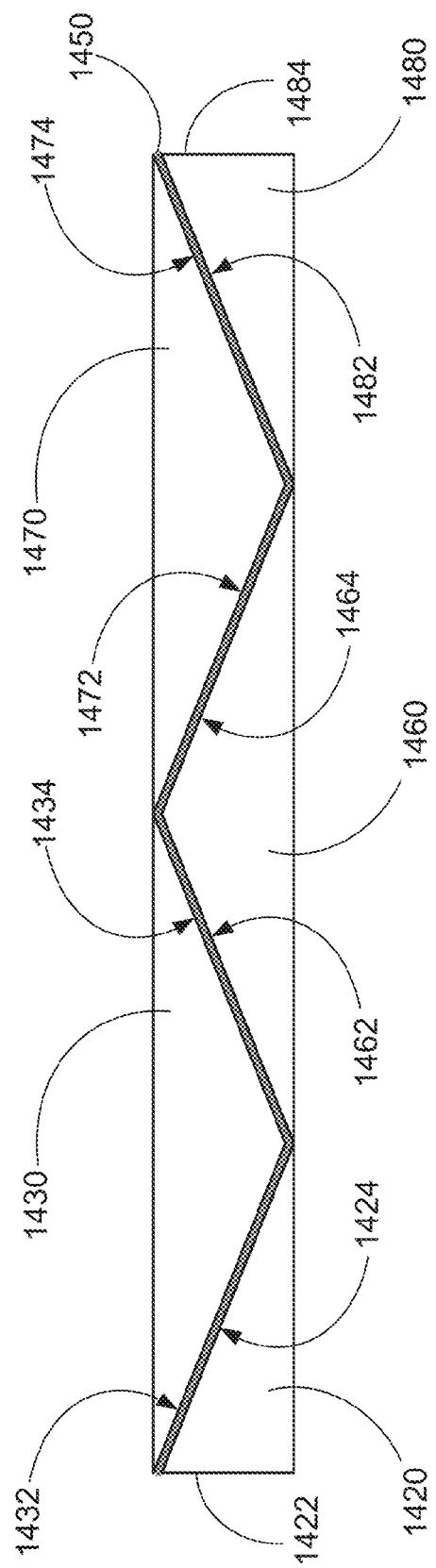

FIGS. 15A-15C illustrate a prism assembly and its components in accordance with some embodiments.

The prism assembly shown in FIG. 15A is similar to prism assembly shown in FIG. 14A, except that the prism assembly shown in FIG. 15A includes five prisms: first prism 1420, second prism 1430, third prism 1460, fourth prism 1470, and fifth prism 1480. For example, the prism assembly includes, in addition to first prism 1420, second prism 1430, and third prism 1460, (i) fourth prism 1470 that is distinct from first prism 1420, second prism 1430, and third prism 1460 and (ii) fifth prism 1480 that is distinct from first prism 1420, second prism 1430, third prism 1460, and fourth prism 1470.

In some embodiments, first prism 1420 is mechanically coupled to second prism 1430, second prism 1430 is mechanically coupled to third prism 1460, third prism 1460 is mechanically coupled to fourth prism 1470, and fourth prism 1470 is mechanically coupled with fifth prism 1480. This reduces or eliminates rotation of first prism 1420 relative to second prism 1430, third prism 1460, fourth prism 1470, and fifth prism 1480; reduces or eliminates rotation of second prism 1430 relative to third prism 1460, fourth prism 1470, and fifth prism 1480; reduces or eliminates rotation of third prism 1460 relative to fourth prism 1470 and fifth prism 1480; and reduces or eliminates rotation of fourth prism 1470 relative to fifth prism 1480. In some embodiments, first prism 1420 is a right triangular prism, second prism 1430 is a triangular prism (other than a right triangular prism), third prism 1460 is a triangular prism (other than a right triangular prism), fourth prism 1470 is a triangular prism (other than a right triangular prism), and fifth prism 1480 is a right triangular prism.

In some embodiments, first prism 1420 is optically coupled with second prism 1430, second prism 1430 is optically coupled with third prism 1460, third prism 1460 is optically coupled with fourth prism 1470, and fourth prism 1470 is optically coupled with fifth prism 1480. For example, light transmitted from first prism 1420 enters second prism 1430, light transmitted from second prism 1430 enters third prism 1460, light transmitted from third prism 1460 enters fourth prism 1470, and light transmitted from fourth prism 1470 enters fifth prism 1480. Light dispersed by the prism assembly is transmitted from fifth prism 1480.

FIG. 15B is an exploded side view of the prism assembly shown in FIG. 15A. First prism 1420 has first optical surface 1422 and second optical surface 1424 that is distinct from, and non-parallel to, first optical surface 1422. In some embodiments, first prism 1420 also has third surface 1426 that is distinct from, and non-parallel to, first optical surface 1422 and second optical surface 1424. Second prism 1430 has first optical surface 1432 and second optical surface 1434 that is distinct from, and non-parallel to, first optical surface 1432. In some embodiments, second prism 1430 also has third surface 1436 that is distinct from, and non-parallel to, first optical surface 1432 and second optical surface 1434. Third prism 1460 has first optical surface 1462 and second optical surface 1464 that is distinct from, and non-parallel to, first optical surface 1462. In some embodiments, third prism 1460 also has third surface 1466 that is distinct from, and non-parallel to, first optical surface 1462 and second optical surface 1464. Fourth prism 1470 has first optical surface 1472, second optical surface 1474 that is distinct from, and non-parallel to, first optical surface 1472, and third surface 1476 that is distinct from, and non-parallel to, first optical surface 1472 and second optical surface 1474. Fifth prism 1480 has first optical surface 1482, second optical surface 1484 that is distinct from, and non-parallel to, first optical surface 1482, and third surface 1486 that is distinct from first optical surface 1482 and second optical surface 1484.

In some embodiments, second optical surface 1424 of first prism 1420 is optically coupled with first optical surface 1432 of second prism 1430 (e.g., light transmitted from second optical surface 1424 of first prism 1420 enters through first optical surface 1432 of second prism 1430). In some embodiments, second optical surface 1434 of second prism 1430 is optically coupled with first optical surface 1462 of third prism 1460 (e.g., light transmitted from second optical surface 1434 of second prism 1430 enters through first optical surface 1462 of third prism 1460). In some embodiments, second optical surface 1464 of third prism 1460 is optically coupled with first optical surface 1472 of fourth prism 1470 (e.g., light transmitted from second optical surface 1464 of third prism 1460 enters through first optical surface 1472 of fourth prism 1470). In some embodiments, second optical surface 1474 of fourth prism 1470 is optically coupled with first optical surface 1482 of fifth prism 1480 (e.g., light transmitted from second optical surface 1474 of fourth prism 1470 enters through first optical surface 1482 of fifth prism 1480).

In some embodiments, first prism 1420 has third surface 1426 that is distinct from, and non-parallel to, first optical surface 1422 and second optical surface 1424. In some embodiments, fifth prism 1480 has third surface 1486 that is distinct from, and non-parallel to first optical surface 1482 and second optical surface 1484. In some embodiments, third surface 1426 of first prism 1420 is substantially perpendicular (e.g., having an angle between 80° and 100°) to first optical surface 1422 of first prism 1420 (e.g., first prism 1420 is a Littrow prism). In some embodiments, third surface 1486 of fifth prism 1480 is substantially perpendicular (e.g., having an angle between 80° and 100°) to second optical surface 1484 of fifth prism 1480 (e.g., fifth prism 1480 is a Littrow prism).

In some embodiments, second prism 1430 has third surface 1436 that is distinct from, and non-parallel to, first optical surface 1432 and second optical surface 1434. In some embodiments, third prism 1460 has third surface 1466 that is distinct from, and non-parallel to, first optical surface 1462 and second optical surface 1464. In some embodiments, fourth prism 1470 has third surface 1476 that is distinct from, and non-parallel to, first optical surface 1472 and second optical surface 1474. In some embodiments, third surface 1426 of first prism 1420 is substantially parallel (e.g., having an angle of 20° or less, 15° or less, or 10° or less) to third surface 1436 of second prism 1430, third surface 1466 of third prism 1460, third surface 1476 of fourth prism 1470, and third surface 1486 of fifth prism 1480.

In some embodiments, an angle defined by first optical surface 1432 of second prism 1430 and third surface 1436 of second prism 1430 corresponds to an angle defined by second optical surface 1434 of second prism 1430 and third surface 1436 of second prism 1430 (e.g., second prism 1430 has a cross-section having a shape of an equilateral triangle). In some embodiments, an angle defined by first optical surface 1462 of third prism 1460 and third surface 1466 of third prism 1460 corresponds to an angle defined by second optical surface 1464 of third prism 1460 and third surface 1466 of third prism 1460 (e.g., third prism 1460 has a cross-section having a shape of an equilateral triangle). In some embodiments, an angle defined by first optical surface 1472 of fourth prism 1470 and third surface 1476 of fourth prism 1470 corresponds to an angle defined by second optical surface 1474 of fourth prism 1470 and third surface 1476 of fourth prism 1470 (e.g., fourth prism 1470 has a cross-section having a shape of an equilateral triangle).

In some embodiments, the angle defined by first optical surface 1432 of second prism 1430 and third surface 1436 of second prism 1430 corresponds to the angle defined by first optical surface 1462 of third prism 1460 and third surface 1466 of third prism 1460. In some embodiments, the angle defined by first optical surface 1432 of second prism 1430 and third surface 1436 of second prism 1430 corresponds to the angle defined by first optical surface 1472 of fourth prism 1470 and third surface 1476 of fourth prism 1470.

In some embodiments, first optical surface 1422 of first prism 1420 is substantially parallel to second optical surface 1484 of fifth prism 1480 (e.g., first optical surface 1422 of first prism 1420 and second optical surface 1484 of fifth prism 1480 have an angle of 20° or less, 15° or less, or 10° or less). In some embodiments, the prism assembly has a shape of a rectangular prism.

In some embodiments, first prism 1420 and fifth prism 1480 have a same shape (e.g., both first prism 1420 and fifth prism 1480 have same dimensions).

In some embodiments, first prism 1420 is a Littrow prism, second prism 1430 is a triangular component prism, third prism 1460 is a triangular component prism, fourth prism 1470 is a triangular component prism, and fifth prism 1480 is a Littrow prism.

In some embodiments, second prism 1430 is an equilateral prism (e.g., an equilateral triangular prism), third prism 1460 is an equilateral prism (e.g., an equilateral triangular prism); and fourth prism 1470 is an equilateral prism (e.g., an equilateral triangular prism).

Although FIG. 15B illustrates that the prism assembly is made by combining five distinct and separate prisms, in some embodiments, one or more prisms are integrally formed. For example, in some embodiments, the first prism, the third prism, and the fifth prism are integrally formed, and/or the second prism and the fourth prism are integrally formed.

FIG. 15C illustrates that first prism 1420 and second prism 1430 are mechanically coupled by adhesive 1450, second prism 1430 and third prism 1460 are mechanically coupled by adhesive 1450, third prism 1460 and fourth prism 1470 are mechanically coupled by adhesive 1450, and fourth prism 1470 and fifth prism 1480 are mechanically coupled by adhesive 1450.

In some embodiments, the prism assembly has an entrance surface (e.g., the first optical surface of the first prism, such as optical surface 1422 of first prism 1420) through which the prism assembly is configured to receive the light from the first set of one or more lenses. The prism assembly has an exit surface (e.g., the second optical of the last prism, such as optical surface 1444 of third prism 1440, in case of prism assembly 1310) through which the prism assembly is configured to transmit the dispersed light toward the second set of one or more lenses. The entrance surface of the prism assembly is substantially parallel (e.g., having an angle of 20° or less, 15° or less, or 10° or less) to the exit surface of the prism assembly. This facilitates maintaining an optical axis before and after the prism assembly, which in turn allows a linear configuration of the spectrometer. In some embodiments, the prism assembly has a shape of a rectangular prism.

In some embodiments, each prism of the prism assembly is configured to disperse light of a wavelength range from 600 nm to 1500 nm. For example, each prism of the prism assembly is configured to disperse light having a wavelength of 600 nm from light having a wavelength of 1500 nm. In some embodiments, each prism of the prism assembly is configured to disperse light having a wavelength of 600 nm and light having a wavelength of 1500 nm In some embodiments, the first prism is made of a first material; the second prism is made of a second material that is distinct from the first material; and the first material has a first Abbe number and the second material has a second Abbe number that is less than the first Abbe number (e.g., the first prism is made of a material having an Abbe number of 50 and the second prism is made of a material having an Abbe number of 30).

In some embodiments, the third prism is made of a third material; the second prism is made of a second material that is distinct from the third material; and the third material has a third Abbe number and the second material has a second Abbe number that is less than the third Abbe number (e.g., the third prism is made of a material having an Abbe number of 50 and the second prism is made of a material having an Abbe number of 30).

In some embodiments, the first prism is made of a first material; the second prism is made of a second material that is distinct from the first material; and the third prism is made of a third material that is distinct from the second material. The first material has a first Abbe number; the third material has a third Abbe number; and the second material has a second Abbe number that is less than the first Abbe number and the third Abbe number (e.g., the first prism is made of a material having an Abbe number of 50, the second prism is made of a material having an Abbe number of 30, and the third prism is made of a material having an Abbe number of 40).

In some embodiments, the first material and the third material are identical (e.g., the first prism is made of a material having an Abbe number of 50, the second prism is made of a material having an Abbe number of 30, and the third prism is made of a material having an Abbe number of 50).

In some embodiments, when the prism assembly includes five prisms, the first prism is made of the first material, the second prism is made of the second material, the third prism is made of the second material, the fourth prism is made of the second material, and the fifth prism is made of the first material.

In some embodiments, when the prism assembly includes five prisms, the first prism is made of the first material, the second prism is made of the second material, the third prism is made of the first material, the fourth prism is made of the second material, and the fifth prism is made of the first material.

In some embodiments, the first material is selected from fluorite crown, phosphate crown, dense phosphate crown, borosilicate crown, barium crown, dense crown, crown, lanthanum crown, very dense crown, barium light flint, crown/flint, lanthanum dense flint, lanthanum flint, barium flint, barium dense flint, very light flint, light flint, flint, dense flint, zinc crown, short flint.

In some embodiments, the second material is selected from fluorite crown, phosphate crown, dense phosphate crown, borosilicate crown, barium crown, dense crown, crown, lanthanum crown, very dense crown, barium light flint, crown/flint, lanthanum dense flint, lanthanum flint, barium flint, barium dense flint, very light flint, light flint, flint, dense flint, zinc crown, short flint.

In some embodiments, the third material is selected from fluorite crown, phosphate crown, dense phosphate crown, borosilicate crown, barium crown, dense crown, crown, lanthanum crown, very dense crown, barium light flint, crown/flint, lanthanum dense flint, lanthanum flint, barium flint, barium dense flint, very light flint, light flint, flint, dense flint, zinc crown, short flint.

In some embodiments, the first Abbe number is greater than 30; the second Abbe number is less than 50; and the third Abbe number is greater than 30.

In some embodiments, the first Abbe number is greater than 40; the second Abbe number is less than 40; and the third Abbe number is greater than 40.

In some embodiments, the first Abbe number is greater than 35. In some embodiments, the first Abbe number is greater than 40. In some embodiments, the first Abbe number is greater than 45. In some embodiments, the first Abbe number is greater than 50. In some embodiments, the first Abbe number is greater than 55. In some embodiments, the first Abbe number is greater than 60. In some embodiments, the first Abbe number is greater than 65. In some embodiments, the first Abbe number is greater than 70. In some embodiments, the first Abbe number is greater than 75. In some embodiments, the first Abbe number is greater than 80.

In some embodiments, the first Abbe number is less than 40. In some embodiments, the first Abbe number is less than 45. In some embodiments, the first Abbe number is less than 50. In some embodiments, the first Abbe number is less than 55. In some embodiments, the first Abbe number is less than 60. In some embodiments, the first Abbe number is less than 65. In some embodiments, the first Abbe number is less than 70. In some embodiments, the first Abbe number is less than 75. In some embodiments, the first Abbe number is less than 80. In some embodiments, the first Abbe number is less than 85.

In some embodiments, the first Abbe number is between 20 and 70. In some embodiments, the first Abbe number is between 35 and 85. In some embodiments, the first Abbe number is between 45 and 75. In some embodiments, the first Abbe number is between 55 and 65. In some embodiments, the first Abbe number is between 30 and 80. In some embodiments, the first Abbe number is between 40 and 70. In some embodiments, the first Abbe number is between 50 and 60. In some embodiments, the first Abbe number is between 45 and 90. In some embodiments, the first Abbe number is between 55 and 85. In some embodiments, the first Abbe number is between 65 and 75.

In some embodiments, the second Abbe number is less than 45. In some embodiments, the second Abbe number is less than 40. In some embodiments, the second Abbe number is less than 35. In some embodiments, the second Abbe number is less than 30. In some embodiments, the second Abbe number is less than 25.

In some embodiments, the second Abbe number is greater than 45. In some embodiments, the second Abbe number is greater than 40. In some embodiments, the second Abbe number is greater than 35. In some embodiments, the second Abbe number is greater than 30. In some embodiments, the second Abbe number is greater than 25. In some embodiments, the second Abbe number is greater than 20.

In some embodiments, the first Abbe number is between 20 and 70. In some embodiments, the second Abbe number is between 35 and 85. In some embodiments, the second Abbe number is between 45 and 75. In some embodiments, the second Abbe number is between 55 and 65. In some embodiments, the second Abbe number is between 30 and 80. In some embodiments, the second Abbe number is between 40 and 70. In some embodiments, the second Abbe number is between 50 and 60. In some embodiments, the second Abbe number is between 45 and 90. In some embodiments, the second Abbe number is between 55 and 85. In some embodiments, the second Abbe number is between 65 and 75.

In some embodiments, the third Abbe number is greater than 35. In some embodiments, the third Abbe number is greater than 40. In some embodiments, the third Abbe number is greater than 45. In some embodiments, the third Abbe number is greater than 50. In some embodiments, the third Abbe number is greater than 55. In some embodiments, the third Abbe number is greater than 60. In some embodiments, the third Abbe number is greater than 65. In some embodiments, the third Abbe number is greater than 70. In some embodiments, the third Abbe number is greater than 75. In some embodiments, the third Abbe number is greater than 80.

In some embodiments, the third Abbe number is less than 40. In some embodiments, the third Abbe number is less than 45. In some embodiments, the third Abbe number is less than 50. In some embodiments, the third Abbe number is less than 55. In some embodiments, the third Abbe number is less than 60. In some embodiments, the third Abbe number is less than 65. In some embodiments, the third Abbe number is less than 70. In some embodiments, the third Abbe number is less than 75. In some embodiments, the third Abbe number is less than 80. In some embodiments, the third Abbe number is less than 85.

In some embodiments, the third Abbe number is between 20 and 70. In some embodiments, the third Abbe number is between 35 and 85. In some embodiments, the third Abbe number is between 45 and 75. In some embodiments, the third Abbe number is between 55 and 65. In some embodiments, the third Abbe number is between 30 and 80. In some embodiments, the third Abbe number is between 40 and 70. In some embodiments, the third Abbe number is between 50 and 60. In some embodiments, the third Abbe number is between 45 and 90. In some embodiments, the third Abbe number is between 55 and 85. In some embodiments, the third Abbe number is between 65 and 75.

In some embodiments, the first Abbe number is between 40 and 70, the second Abbe number is between 20 and 40, and the third Abbe number is between 40 and 70.

In some embodiments, each prism of the prism assembly has a refractive index that is within 20% of a reference refractive index. For example, when the reference refractive index is 1.5, each prism of the prism assembly has a refractive index that is between 1.2 and 1.8). In some embodiments, each prism of the prism assembly has a refractive index that is within 15% of a reference refractive index. In some embodiments, each prism of the prism assembly has a refractive index that is within 10% of a reference refractive index. In some embodiments, each prism of the prism assembly has a refractive index that is within 5% of a reference refractive index. In some embodiments, each prism of the prism assembly has a refractive index that is within 3% of a reference refractive index. In some embodiments, each prism of the prism assembly has a refractive index that is within 1% of a reference refractive index.

In some embodiments, the reference refractive index is between 1.5 and 1.9. In some embodiments, the reference refractive index is between 1.6 and 1.8. In some embodiments, the reference refractive index is between 1.65 and 1.75. In some embodiments, the reference refractive index is between 1.6 and 1.9. In some embodiments, the reference refractive index is between 1.7 and 1.8. In some embodiments, the reference refractive index is between 1.5 and 1.8. In some embodiments, the reference refractive index is between 1.6 and 1.7.

In some embodiments, each prism of the prism assembly is coupled with one or more prisms of the prism assembly using an adhesive that has a refractive index that is within 20% of the reference refractive index. For example, as shown in FIGS. 14C and 15C, the prisms are attached to one another by adhesive 1450. When the reference refractive index is 1.5, the adhesive has a refractive index that is between 1.2 and 1.8. In some embodiments, each prism of the prism assembly is coupled with one or more prisms of the prism assembly using an adhesive that has a refractive index that is within 15% of the reference refractive index. In some embodiments, each prism of the prism assembly is coupled with one or more prisms of the prism assembly using an adhesive that is within 10% of the reference refractive index. In some embodiments, each prism of the prism assembly is coupled with one or more prisms of the prism assembly using an adhesive that has a refractive index that is within 5% of the reference refractive index. In some embodiments, each prism of the prism assembly is coupled with one or more prisms of the prism assembly using an adhesive that has a refractive index that is within 3% of the reference refractive index. In some embodiments, each prism of the prism assembly is coupled with one or more prisms of the prism assembly using an adhesive that has a refractive index that is within 1% of the reference refractive index.

FIG. 16 illustrates shifting of a spectrum caused by rotation of respective optical elements in accordance with some embodiments.

In FIG. 16, chart 1610 and chart 1620 illustrate the effect of the rotation of a mirror (e.g., mirror 1113) shown in FIG. 12E. Chart 1610 illustrates that, when the mirror is at a default angular position (e.g., $\theta=0°$), both a first wavelength represented by spot 1612 and a second wavelength represented by spot 1614 are projected on a detector. Chart 1610 illustrates that, when the mirror has rotated by 1°, the first wavelength represented by spot 1622 is projected on the detector but the second wavelength is not detected by the detector (e.g., a spot that corresponds to the second wavelength is projected outside the detector). In addition, the position of spot 1622 on the detector is different from the position of spot 1612 on the detector. This often requires a calibration to account for the position difference of a same wavelength on the detector.

In contrast, in FIG. 16, chart 1630 and chart 1640 illustrate the effect of the rotation of a prism assembly (e.g., prism assembly 1310) shown in FIG. 13. Chart 1630 illustrates that there is no significant difference in positions of respective wavelengths between a configuration where the prism assembly is at a default angular position (e.g., $\theta=0°$) and a configuration where the prism assembly has rotated by 1°.

Thus, FIG. 16 shows that a spectrometer with the prism assembly is more robust to any rotational misalignment of an optical component (e.g., a mirror or a prism) than a spectrometer with one or more mirrors and a conventional dispersive optical element.

The spectrometer with the prism assembly can better maintain its alignment even when the prism assembly is rotated. Thus, the spectrometer with the prism assembly is less sensitive to any variation in the angular position of the prism assembly, such spectrometer can be manufactured more easily. In addition, such spectrometer is more robust to any changes in the angular position of the prism assembly, which in turn allows the spectrometer to maintain its calibration. This is especially useful for field applications, where the spectrometer can be subject to mechanical shocks, vibrations, and temperature changes, which can change the angular position of the prism assembly.

Figure 17:
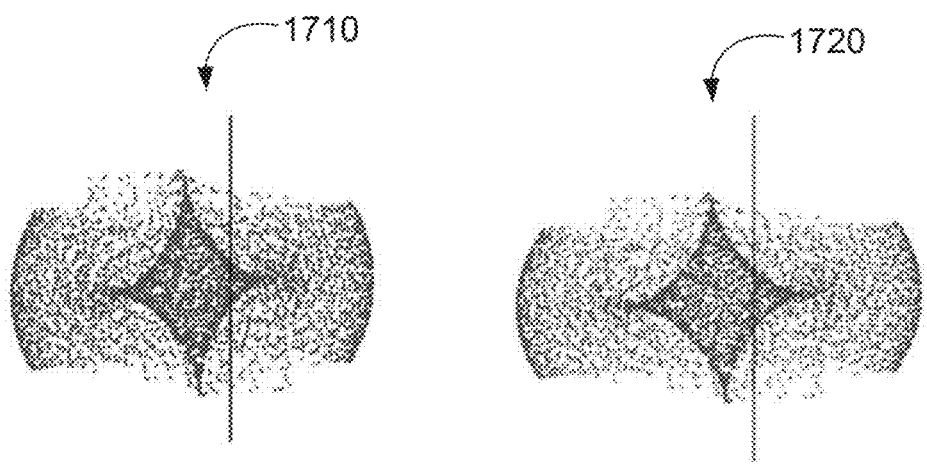
FIG. 17 illustrates image distortions caused by a three-component prism assembly and a five-component prism assembly in accordance with some embodiments.

FIG. 17 illustrates image distortions caused by a three-component prism assembly and a five-component prism assembly in accordance with some embodiments.

In FIG. 17, plot 1710 illustrates image distortion caused by a three-component prism assembly (e.g., prism assembly 1310 shown in FIG. 14A) and plot 1720 illustrate image distortion caused by a five-component prism assembly (e.g., the prism assembly shown in FIG. 15A). FIG. 17 shows that the five-component prism assembly causes less distortion than the three-component prism assembly (e.g., the five-component prism assembly causes less distortion than the three-component prism assembly by more than 60%). Thus, in some embodiments where it is necessary to reduce the image distortion, the spectrometer includes a prism assembly with the five prisms. In some embodiments, a prism assembly with additional prisms (e.g., a prism assembly with seven prisms or nine prisms) is used.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An apparatus for analyzing light, comprising:
an input aperture for receiving light;
a first set of one or more lenses configured to relay light from the input aperture;
a prism assembly configured to disperse light from the first set of one or more lenses, the prism assembly including a plurality of prisms that includes a first prism, a second prism that is distinct from the first prism, and a third prism that is distinct from the first prism and the second prism, wherein the first prism is mechanically coupled with the second prism and the second prism is mechanically coupled with the third prism;
a second set of one or more lenses configured to focus the dispersed light from the prism assembly; and
an array detector configured for converting the light from the second set of one or more lenses to electrical signals, wherein:
the first prism has a first optical surface and a second optical surface that is distinct from, and non-parallel to, the first optical surface;
the second prism has a first optical surface and a second optical surface that is distinct from, and non-parallel to, the first optical surface;
the third prism has a first optical surface and a second optical surface that is distinct from, and non-parallel to, the first optical surface;
the second optical surface of the first prism is optically coupled with the first optical surface of the second prism;
the second optical surface of the second prism is optically coupled with the first optical surface of the third prism;
the first prism is made of a first material;
the second prism is made of a second material that is distinct from the first material;
the first material has a first Abbe number and the second material has a second Abbe number that is less than the first Abbe number; and
an optical axis of the first set of one or more lenses is parallel to an optical axis of the second set of one or more lenses.

2. The apparatus of claim 1, wherein the first prism is optically coupled with the second prism and the second prism is optically coupled with the third prism.

3. The apparatus of claim 1, wherein:
the first optical surface of the first prism is parallel to the first optical surface of the second prism; and
the second optical surface of the second prism is parallel to the first optical surface of the third prism.

4. The apparatus of claim 1, wherein:
the first prism has a third surface that is distinct from, and non-parallel to, the first optical surface and the second optical surface;
the third prism has a third surface that is distinct from, and non-parallel to, the first optical surface and the second optical surface;
the third surface of the first prism and the first optical surface of the first prism have an angle between 80° and 100°; and
the third surface of the third prism and the second optical surface of the third prism have an angle between 80° and 100°.

5. The apparatus of claim 4, wherein:
the second prism has a third surface that is distinct from, and non-parallel to, the first optical surface of the second prism and the second optical surface of the second prism.

6. The apparatus of claim 5, wherein:
the third surface of the second prism is parallel to the third surface of the first prism and the third surface of the third prism.

7. The apparatus of claim 5, wherein:
the first optical surface of the second prism and the third surface of the second prism define a first angle;
the second optical surface of the second prism and the third surface of the second prism define a second angle; and
the second angle corresponds to the first angle.

8. The apparatus of claim 1, wherein:
the first optical surface of the first prism is parallel to the second optical surface of the third prism.

9. The apparatus of claim 1, wherein the first prism is a Littrow prism, the second prism is a triangular component prism, and the third prism is a Littrow prism.

10. The apparatus of claim 1, wherein the second prism is an equilateral prism.

11. The apparatus of claim 1, wherein:
the prism assembly has an entrance surface through which the prism assembly is configured to receive the light from the first set of one or more lenses;
the prism assembly has an exit surface through which the prism assembly is configured to transmit the dispersed light toward the second set of one or more lenses; and
the entrance surface of the prism assembly is parallel to the exit surface of the prism assembly.

12. The apparatus of claim 1, wherein each prism of the prism assembly is configured to disperse light of a wavelength range from 600 nm to 1500 nm, including light having a wavelength of 600 nm and light having a wavelength of 1500 nm.

13. The apparatus of claim 1, wherein:
the third prism is made of a third material that is distinct from the second material;
the third material has a third Abbe number; and
the second Abbe number is less than the third Abbe number.

14. The apparatus of claim 13, wherein:
the first material and the third material are identical.

15. The apparatus of claim 14, wherein:
the first Abbe number is greater than 40;
the second Abbe number is less than 40; and
the third Abbe number is greater than 40.

16. The apparatus of claim 1, wherein:
each prism of the prism assembly has a refractive index that is within 20% of a reference refractive index.

17. The apparatus of claim 16, wherein:
each prism of the prism assembly is coupled with one or more prisms of the prism assembly using an adhesive that has a refractive index that is within 20% of the reference refractive index.

18. The apparatus of claim 1, wherein:
the prism assembly includes a fourth prism that is distinct from the first prism, the second prism, and the third prism;
the fourth prism has a first optical surface and a second optical surface that is distinct from, and non-parallel to, the first optical surface; and
the second optical surface of the third prism is optically coupled with the first optical surface of the fourth prism.

19. The apparatus of claim 18, wherein:
the prism assembly includes a fifth prism that is distinct from the first prism, the second prism, the third prism, and the fourth prism;
the fifth prism has a first optical surface and a second optical surface that is distinct from, and non-parallel to, the first optical surface; and
the second optical surface of the fourth prism is optically coupled with the first optical surface of the fifth prism.

20. The apparatus of claim 19, wherein:
the fourth prism is made of the second material; and
the fifth prism is made of the first material.

* * * * *

UNITED STATES PATENT AND TRADEMARK OFFICE
CERTIFICATE OF CORRECTION

PATENT NO. : 10,281,327 B2
APPLICATION NO. : 15/821591
DATED : May 7, 2019
INVENTOR(S) : Lee et al.

Page 1 of 1

It is certified that error appears in the above-identified patent and that said Letters Patent is hereby corrected as shown below:

In the Specification

Column 1, Line 5 please delete "RELATED APPLICATION" and insert --RELATED APPLICATIONS--;

Column 1, Line 20 after RELATED APPLICATIONS and before TECHNICAL FIELD, please insert:
--GOVERNMENT LICENSE RIGHTS
This work was partially supported by Korea Institute of Planning and Evaluation for Technology in Food, Agriculture, Forestry (IPET) through High Value-added Food Technology Development Program, funded by Ministry of Agriculture, Food and Rural Affairs (MAFRA) (award no. 117062-3).--.

Signed and Sealed this
Tenth Day of March, 2020

Andrei Iancu
*Director of the United States Patent and Trademark Office*